(12) United States Patent
Park et al.

(10) Patent No.: US 12,494,181 B2
(45) Date of Patent: Dec. 9, 2025

(54) DISPLAY SUBSTRATE AND DISPLAY DEVICE

(71) Applicants: Fuzhou BOE Optoelectronics Technology Co., Ltd., Fujian (CN); BOE TECHNOLOGY GROUP CO., LTD., Beijing (CN)

(72) Inventors: Sangjin Park, Beijing (CN); Jixiang Chen, Beijing (CN); Wenchao Wang, Beijing (CN); Jinliang Wang, Beijing (CN); Xin Fang, Beijing (CN); Xu Xu, Beijing (CN); Shanshan Xu, Beijing (CN)

(73) Assignees: Fuzhou BOE Optoelectronics Technology Co., Ltd., Fujian (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/578,292

(22) PCT Filed: Feb. 23, 2023

(86) PCT No.: PCT/CN2023/077994
§ 371 (c)(1),
(2) Date: Jan. 10, 2024

(87) PCT Pub. No.: WO2024/174186
PCT Pub. Date: Aug. 29, 2024

(65) Prior Publication Data
US 2025/0104663 A1    Mar. 27, 2025

(51) Int. Cl.
G09G 3/36     (2006.01)
G02F 1/1343   (2006.01)
(Continued)

(52) U.S. Cl.
CPC ..... *G09G 3/3607* (2013.01); *G02F 1/134345* (2021.01); *G02F 1/13454* (2013.01);
(Continued)

(58) Field of Classification Search
None
See application file for complete search history.

(56) References Cited

U.S. PATENT DOCUMENTS

| 11,410,627 B2 | 8/2022 | Xiao et al. |
| 2007/0097072 A1 | 5/2007 | Kim et al. |

(Continued)

FOREIGN PATENT DOCUMENTS

| CN | 1959480 A | 5/2007 |
| CN | 101520580 A | 9/2009 |

(Continued)

*Primary Examiner* — Duane N Taylor, Jr.
(74) *Attorney, Agent, or Firm* — McCoy Russell LLP

(57) ABSTRACT

A display substrate includes a base substrate, a first drive module, a second drive module, an array of sub-pixel circuits, rows of gate lines, and columns of data lines. A portion of sub-pixel circuits having a first color in the same row are electrically connected to one row of the gate line, another portion of sub-pixel circuits having the first color in the same row are electrically connected to another row of the gate line. The first drive module is electrically connected to a first end of the row of gate line and the second drive module is electrically connected to a second end of the another row of gate line. The first end and the second end are opposite ends. In the sub-pixel circuits located in the same row, at least two sub-pixel circuits at the same side of the data line are electrically connected to the data line.

15 Claims, 8 Drawing Sheets

(51) Int. Cl.
*G02F 1/1345* (2006.01)
*G02F 1/1362* (2006.01)

(52) U.S. Cl.
CPC ..... *G02F 1/136286* (2013.01); *G09G 3/3648* (2013.01); *G09G 2300/0452* (2013.01); *G09G 2300/0842* (2013.01); *G09G 2310/08* (2013.01); *G09G 2320/0242* (2013.01)

(56) References Cited

U.S. PATENT DOCUMENTS

| | | |
|---|---|---|
| 2011/0134103 A1 | 6/2011 | Nam et al. |
| 2012/0212401 A1* | 8/2012 | Bae ................ G09G 3/3677 345/87 |
| 2017/0337871 A1* | 11/2017 | Kurokawa ........... G09G 3/2096 |
| 2018/0075818 A1* | 3/2018 | Kim .................... G09G 3/3696 |
| 2021/0056924 A1 | 2/2021 | Xiao et al. |
| 2022/0121066 A1* | 4/2022 | Kawahira ............ G06F 3/0412 |
| 2022/0254865 A1 | 8/2022 | Qu et al. |

FOREIGN PATENT DOCUMENTS

| | | | | |
|---|---|---|---|---|
| CN | 102087842 A | | 6/2011 | |
| CN | 102651206 A | | 8/2012 | |
| CN | 102034448 B | * | 2/2014 | ............. G09G 3/003 |
| CN | 104280909 A | | 1/2015 | |
| CN | 110456585 A | | 11/2019 | |
| CN | 111429857 A | | 7/2020 | |
| CN | 111463244 A | | 7/2020 | |
| CN | 211124966 U | | 7/2020 | |
| CN | 113608386 A | | 11/2021 | |

* cited by examiner

DISPLAY SUBSTRATE AND DISPLAY DEVICE

CROSS REFERENCE TO RELATED APPLICATION

This application is the U.S. national phase of PCT Application No. PCT/CN2023/077994 filed on Feb. 23, 2023.

TECHNICAL FIELD

The present disclosure relates to the field of display technologies, in particular to a display substrate and a display device.

BACKGROUND

In the relevant art, sub-pixel circuits having the same color and located in the same row are electrically connected to the same row of gate line, which results in that the brightness of far-end pixels electrically connected to the row of gate line is greater than the brightness of near-end pixels electrically connected to the row of gate line, resulting in poor display quality with half red and half green.

SUMMARY

In a first aspect, an embodiment of the present disclosure provides a display substrate, including:
- a base substrate having a display area and a peripheral area surrounding the display area;
- a first drive module and a second drive module located in the peripheral area;
- a plurality of sub-pixel circuits arranged in an array in the display area; the plurality of sub-pixel circuits having at least two colors;
- a plurality of rows of gate lines, with two rows of the gate lines between two adjacent rows of the sub-pixel circuits; and,
- a plurality of columns of data lines, with one column of the data line between every two columns of the sub-pixel circuits;
- a portion of sub-pixel circuits having the same color located in the same row are electrically connected to one row of the gate line and are configured to write data voltage under control of the gate drive signal provided by the row of gate line;
- another portion of sub-pixel circuits having the same color located in the same row are electrically connected to another row of the gate line and are configured to receive data voltage under control of the gate drive signal provided by the other row of gate line;
- the first drive module is electrically connected to a first end of the row of gate line and is configured to provide a gate drive signal to the row of gate line;
- the second drive module is electrically connected to a second end of the other row of gate line and is configured to provide a gate drive signal to the other row of gate line;
- the first end and the second end are opposite ends;
- in the sub-pixel circuits located in the same row, at least two sub-pixel circuits located at the same side of the data line are electrically connected to the data line.

Optionally, in the sub-pixel circuits located in the same row, at least two sub-pixel circuits are provided between two columns of the data lines, and the at least two sub-pixel circuits are electrically connected to one of the two columns of data lines.

Optionally, two adjacent sub-pixel circuits having the same color located in the same row are electrically connected to different rows of gate lines, and the sub-pixel circuits are configured to receive data voltage under control of the gate drive signal provided by their electrically connected gate lines.

Optionally, the display substrate includes N rows of sub-pixel circuits and 2N rows of gate lines; N is a positive integer;
- the odd-column sub-pixel circuits in the sub-pixel circuits having the same color located in the n-th row are electrically connected to the (2n−1)-th row of gate line, and the even-column sub-pixel circuits in the sub-pixel circuits having the same color located in the n-th row are electrically connected to the 2n-th row of gate line; or,
- the odd-column sub-pixel circuits in the sub-pixel circuits having the same color located in the n-th row are electrically connected to the 2n-th row of gate line, and the even-column sub-pixel circuits in the sub-pixel circuits having the same color located in the n-th row are electrically connected to the (2n−1)-th row of gate line;
- n is a positive integer less than or equal to N.

Optionally, the first drive module includes N stages of first drive circuits and the second drive module includes N stages of second drive circuits;
- the n-th stage first drive circuit is electrically connected to the first end of the (2n−1)-th row of gate line and is configured to provide the gate drive signal to the (2n−1)-th row of gate line;
- the n-th stage second drive circuit is electrically connected to the second end of the 2n-th row of gate line and is configured to provide the gate drive signal to the 2n-th row of gate lines.

Optionally, the first drive module includes N stages of first drive circuits and the second drive module includes N stages of second drive circuits;
- the n-th stage first drive circuit is electrically connected to the second end of the (2n−1)-th row of gate line and is configured to provide the gate drive signal to the (2n−1)-th row of gate line;
- the n-th stage second drive circuit is electrically connected to the first end of the 2n-th row of gate line and is configured to provide the gate drive signal to the 2n-th row of gate lines.

Optionally, the sub-pixel circuit includes a data writing transistor and a pixel electrode;
- the gate of the data writing transistor is electrically connected to the gate line electrically connected to the sub-pixel circuit, the first pole of the data writing transistor is electrically connected to the data line, and the second pole of the data writing transistor is electrically connected to the pixel electrode.

Optionally, the display substrate according to at least one embodiment of the present disclosure includes N rows and M columns of red sub-pixel circuits, N rows and M columns of green sub-pixel circuits, and N rows and M columns of blue sub-pixel circuits;
- the odd-column red sub-pixel circuits in the n-th row are electrically connected to the (2n−1)-th row of gate line, and the even-column red sub-pixel circuits in the n-th row are electrically connected to the 2n-th row of gate line;

the odd-column green sub-pixel circuits in the n-th row are electrically connected to the 2n-th row of gate line, and the even-column green sub-pixel circuits in the n-th row are electrically connected to the (2n−1)-th row of gate line;

the odd-column blue sub-pixel circuits in the n-th row are electrically connected to the (2n−1)-th row of gate line, and the even-column blue sub-pixel circuits in the n-th row are electrically connected to the 2n-th row of gate line;

M and N are positive integers, n is a positive integer less than or equal to N.

Optionally, the display substrate according to at least one embodiment of the present disclosure includes N rows and M columns of red sub-pixel circuits, N rows and M columns of green sub-pixel circuits, and N rows and M columns of blue sub-pixel circuits;

the odd-column red sub-pixel circuits in the n-th row are electrically connected to the 2n-th row of gate line, and the even-column red sub-pixel circuits in the n-th row are electrically connected to the (2n−1)-th row of gate line;

the odd-column green sub-pixel circuits in the n-th row are electrically connected to the (2n−1)-th row of gate line, and the even-column green sub-pixel circuits in the n-th row are electrically connected to the 2n-th row of gate line;

the odd-column blue sub-pixel circuits in the n-th row are electrically connected to the 2n-th row of gate line, and the even-column blue sub-pixel circuits in the n-th row are electrically connected to the (2n−1)-th row of gate line;

M and N are positive integers, n is a positive integer less than or equal to N.

Optionally, the (2a−1)-th column red sub-pixel circuits in odd rows are electrically connected to the (4a−3)-th column data line, the (2a−1)-th column green sub-pixel circuits in odd rows are electrically connected to the (4a−3)-th column data line, and the (2a−1)-th column blue sub-pixel circuits in odd rows are electrically connected to the (4a−2)-th column data line;

the 2a-th column red sub-pixel circuits in odd rows are electrically connected to the (4a−2)-th column data line, the 2a-th column green sub-pixel circuits in odd rows are electrically connected to the (4a−1)-th column data line, and the 2a-th column blue sub-pixel circuits in odd rows are electrically connected to the (4a−1)-th column data line;

the (2a−1)-th column red sub-pixel circuits in even rows are electrically connected to the (4a−2)-th column data line, the (2a−1)-th column green sub-pixel circuits in even rows are electrically connected to the (4a−2)-th column data line, and the (2a−1)-th column blue sub-pixel circuits in even rows are electrically connected to the (4a−1)-th column data line;

the 2a-th column red sub-pixel circuits in even rows are electrically connected to the (4a−1)-th column data line, the 2a-th column green sub-pixel circuits in even rows are electrically connected to the 4a-th column data line, and the 2a-th column blue sub-pixel circuits in even rows are electrically connected to the 4a-th column data line;

a is a positive integer.

Optionally, the first drive circuit is also electrically connected to a corresponding first output clock signal line and is configured to provide a first output clock signal on the first output clock signal line to the gate line electrically connected to the first drive circuit under control of a potential of a corresponding first pull-up node;

the second drive circuit is also electrically connected to a corresponding second output clock signal line and is configured to provide a second output clock signal on the second output clock signal line to the gate line electrically connected to the second drive circuit under control of a potential of a corresponding second pull-up node.

Optionally, the display substrate according to at least one embodiment of the present disclosure further includes a first resistor and a second resistor;

the first resistor is electrically connected to the first output clock signal line;

the second resistor is electrically connected to the second output clock signal line.

Optionally, the resistance value of the first resistor and the resistance value of the second resistor are greater than a resistance value threshold.

Optionally, the display substrate according to at least one embodiment of the present disclosure includes a gate metal layer disposed on the base substrate;

the gate lines are formed in the gate metal layer;

the thickness of the gate metal layer is greater than a first thickness threshold.

Optionally, the display substrate according to at least one embodiment of the present disclosure further includes a common electrode; the display substrate further includes a first conductive layer, an insulating layer, and a second conductive layer, which are sequentially layered along a direction away from the base substrate;

the pixel electrode is formed in the first conductive layer, and the common electrode is formed in the second conductive layer;

the thickness of the insulating layer is less than a second thickness threshold.

Optionally, the gate lines extend in a horizontal direction, with the first end being the left end and the second end being the right end.

In a second aspect, an embodiment of the present disclosure provides a display device including the foregoing display substrate.

Optionally, the display device according to at least one embodiment of the present disclosure further includes a voltage supply unit and a clock signal generation unit; the first drive module includes multiple stages of first drive circuits, and the second drive module includes multiple stages of second drive circuits; the first drive circuit is electrically connected to the corresponding first output clock signal line; the second drive circuit is electrically connected to the corresponding second output clock signal line;

the voltage supply unit is configured to provide a high voltage signal to the clock signal generation unit;

the clock signal generation unit is configured to generate a first output clock signal and a second output clock signal based on the high voltage signal.

Optionally, the voltage supply unit is configured to control the voltage value of the high voltage signal to be less than a voltage value threshold.

DETAILED DESCRIPTION

Figure 1:
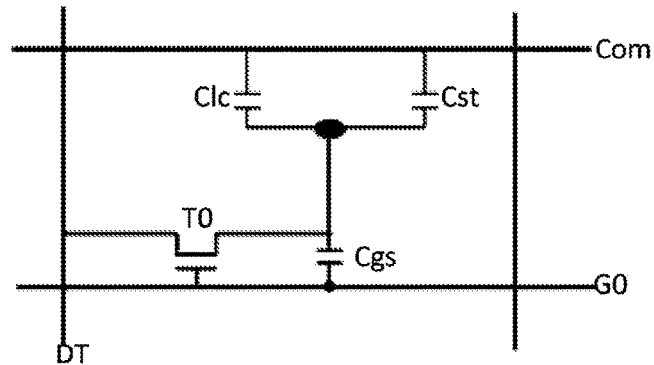
FIG. 1 is a structural diagram of a sub-pixel circuit in a thin film transistor (TFT)-liquid crystal display (LCD) in the related art.

The technical solutions in the embodiments of the present disclosure will be clearly and completely described hereinafter in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

The transistors used in all the embodiments of the present disclosure may be thin film transistors, field effect transistors or other devices with the same characteristics. In the embodiments of the present disclosure, in order to distinguish two electrodes of the transistor other than the gate, one of the electrodes is referred to as a first electrode, and the other electrode is referred to as a second electrode.

In actual operation, when the transistor is a thin film transistor or a field effect transistor, the first electrode may be a drain electrode, and the second electrode may be a source electrode, or the first electrode may be a source electrode, and the second electrode may be a drain electrode.

The display substrate according to an embodiment of the present disclosure includes:
- a base substrate having a display area and a peripheral area surrounding the display area;
- a first drive module and a second drive module located in the peripheral area;
- a plurality of sub-pixel circuits arranged in an array in the display area; the plurality of sub-pixel circuits having at least two colors;
- a plurality of rows of gate lines, with two rows of the gate lines between two adjacent rows of the sub-pixel circuits; and,
- a plurality of columns of data lines, with one column of the data line between every two columns of the sub-pixel circuits;
- where a portion of sub-pixel circuits having the same color located in the same row are electrically connected to one row of the gate line and are configured to write data voltage under control of a gate drive signal provided by the row of gate line;
- another portion of sub-pixel circuits having the same color located in the same row are electrically connected to another row of the gate line and are configured to receive data voltage under control of the gate drive signal provided by the other row of gate line;
- the first drive module is electrically connected to a first end of the row of gate line and is configured to provide a gate drive signal to the row of gate line;
- the second drive module is electrically connected to a second end of the other row of gate line and is configured to provide a gate drive signal to the other row of gate line;
- the first end and the second end are opposite ends;
- in the sub-pixel circuits located in the same row, at least two sub-pixel circuits located at the same side of the data line are electrically connected to the data line.

In at least one embodiment of the present disclosure, a portion of sub-pixel circuits having the same color located in the same row are electrically connected to one row of gate line, and the first drive module is electrically connected to the first end of the row of gate line to provide the gate drive signal to the row of gate line; another portion of sub-pixel circuits having the same color located in the same row are electrically connected to another row of gate line, and the second drive module is electrically connected to the second end of the another row of gate line and is configured to provide the gate drive signal to the another row of gate line. The first and second ends are opposite ends, and this can reduce the display defect of half red and half green under grayscale screens.

In at least one embodiment of the present disclosure, in the sub-pixel circuits located in the same row, at least two sub-pixel circuits located at the same side of the data line are electrically connected to the data line.

In a specific implementation, in the sub-pixel circuits located in the same row, at least two sub-pixel circuits located at a first side of the data line are electrically connected to the data line, or at least two sub-pixel circuits located at a second side of the data line are electrically connected to the data line. The first and second sides can be opposite sides.

Optionally, the first side can be a left side and the second side can be a right side.

In at least one embodiment of the present disclosure, the plurality of sub-pixel circuits may have at least two colors; for example, the plurality of sub-pixel circuits may have three or four colors.

Optionally, the plurality of sub-pixel circuits having three colors may refer to: a first portion of the plurality of sub-pixel circuits having a first color, a second portion of the plurality of sub-pixel circuits having a second color, and sub-pixel circuits other than the first and second portions of the plurality of sub-pixel circuits having a third color.

The plurality of sub-pixel circuits having four colors may refer to: a first portion of the plurality of sub-pixel circuits having a first color, a second portion of the plurality of sub-pixel circuits having a second color, a third portion of the plurality of sub-pixel circuits having a third color, and sub-pixel circuits other than the first, second and third portions of the plurality of sub-pixel circuits having a fourth color.

For example, the first color may be red, the second color may be green, the third color may be blue, and the fourth color may be white, but not limited to this.

Optionally, in the sub-pixel circuits located in the same row, at least two sub-pixel circuits are provided between two columns of the data lines, and the at least two sub-pixel circuits are electrically connected to one of the two columns of data lines.

In a specific implementation, at least two sub-pixel circuits can be provided between two columns of the data lines, and the at least two sub-pixel circuits can be both electrically connected to one of the two columns of data lines to facilitate wiring.

In the related art, as shown in FIG. 1, a thin film transistor (TFT)-liquid crystal display (LCD) may include a thin film transistor T0. A gate of T0 is electrically connected to the gate line G0, a drain of T0 is electrically connected to the data line DT, and a source of T0 is electrically connected to the pixel electrode.

The pixel electrode is similar to a parallel plate capacitor, and there are mainly three capacitors on the pixel electrode: parasitic capacitance Cgs between a gate metal and a source metal, storage capacitance Cst between the pixel electrode and the common electrode Com, and liquid crystal capacitance Clc between the liquid crystal and the common electrode Com.

An important factor in measuring the switching quality of a thin film transistor is the parasitic capacitance Cgs between the gate metal and source metal. Since switching of a thin film transistor is close to transient, when a gate voltage Vg drops from a high level Vgon to a low level Vgoff, the change $\Delta Vg$ of Vg is coupled to the pixel electrode by the parasitic capacitance Cgs, causing the pixel voltage Vp to jump, with a jump amount of $\Delta Vp$. Since after the thin film transistor is turned off, the pixel electrode is independent of its surroundings, there is no path for a total charge received by the pixel electrode during charging and discharging, to flow out. According to conservation of total charges of pixels at the moment when thin film transistor turns off, the following formula can be approximately derived:

$$\Delta Vp = Cgsz(Vgh - Vgl)/(Cstz + Clcz + Cgsz);$$

Where Vgon is a turn-on voltage, Vgoff is a turn-off voltage, Vgh is the voltage value of Vgon, Vgl is the voltage value of Vgoff, Cgsz is the capacitance value of Cgs, Cstz is the capacitance value of Cst, Clcz is the capacitance value of Clc, and Cgsz is the capacitance value of Clc.

In the related technology, in order to achieve a narrow bezel, a first driving module and a second driving module can be respectively arranged on the left and right sides of the effective display area. The first driving module is electrically connected to the left end of the odd-row gate lines, and the second driving module is electrically connected to the right end of the even-row gate lines. Alternatively, the first driving module is electrically connected to the left end of the even-row gate lines, and the second driving module is electrically connected to the right end of the odd-row gate lines, that is, a GOA (Gate On Array, array substrate row drive) cross-drive product is adopted. The delay at the near end of a row of gate line is less than the delay at the far end, resulting in $\Delta Vp$ at the near end being greater than $\Delta Vp$ at the far end. Macroscopically, this is reflected as the grayscale at the near-end pixels being much smaller than that at the far-end pixels, that is, the pixels at the far-end are brighter than those at the near-end.

In related technology, sub-pixel circuits of the same color located in the same row are electrically connected to the same row of gate line, resulting in the brightness of far-end pixels electrically connected to that row of gate line being greater than the brightness of near-end pixels electrically connected to that row of gate line, resulting in poor display quality with half red and half green.

According to the above display issues, in at least one embodiment of the present disclosure, a portion of sub-pixel circuits having the same color located in the same row are electrically connected to one row of gate line, and the first drive module is electrically connected to the first end of the row of gate line to provide the gate drive signal to the row of gate line; another portion of sub-pixel circuits having the same color located in the same row are electrically connected to another row of gate line, and the second drive module is electrically connected to the second end of the other row of gate line and is configured to provide the gate drive signal to the other row of gate line. Since the same color group is controlled by different rows of gate lines, the brightness of the same color group is uniform within the display area; under grayscale screens, spatially, different color groups can have average brightness and there will be no phenomenon of half red and half green.

The display substrate according to at least one embodiment of the present disclosure is suitable for MNT narrow bezel display products, further enhancing the competitiveness of display products.

The display substrate according to at least one embodiment of the present disclosure is also suitable for COF (chip-on-film) products and oxide products.

Optionally, the gate lines extend in the horizontal direction, with the first end being the left end and the second end being the right end.

In at least one embodiment of the present disclosure, two adjacent sub-pixel circuits having the same color located in the same row are electrically connected to different rows of gate lines, and the sub-pixel circuits are configured to receive data voltage under control of the gate drive signal provided by their electrically connected gate lines.

Optionally, the display substrate includes N rows of sub-pixel circuits and 2N rows of gate lines; N is a positive integer;
the odd-column sub-pixel circuits in the same color sub-pixel circuits located in the n-th row are electrically connected to the (2n−1)-th row of gate line, and the even-column sub-pixel circuits in the same color sub-pixel circuits located in the n-th row are electrically connected to the 2n-th row of gate line; or,
the odd-column sub-pixel circuits in the same color sub-pixel circuits located in the n-th row are electrically connected to the 2n-th row of gate line, and the even-column sub-pixel circuits in the same color sub-pixel circuits located in the n-th row are electrically connected to the (2n−1)-th row of gate line;
n is a positive integer less than or equal to N.

In a specific implementation, the odd-column sub-pixel circuits of the same color located in the same row are electrically connected to the odd-row gate lines, and the even-row sub-pixel circuits of the same color located in the same row are electrically connected to the even-row gate lines; alternatively, the odd-column sub-pixel circuits of the same color located in the same row are electrically connected to the even-row gate lines, and the even-row sub-pixel circuits of the same color located in the same row are electrically connected to the odd-row gate lines. By adopting the above connection relationship, it is possible to make the grayscale of adjacent columns of sub-pixel circuits of the same color located in the same row different, so that the brightness of the same color group is uniform within any display area. Under grayscale screens, spatially, different color groups can have average brightness and there will be no phenomenon of half red and half green.

While ensuring that the pixel aperture ratio is greater than 50% and meeting the charging criterion of 98.5%, through size scanning, the display substrate according to at least one embodiment of the present disclosure can support the design size of Dual Gate (dual gate) cross-drive products up to 27FHD, but not limited to this.

In at least one embodiment of the present disclosure, the first drive module includes N stages of first drive circuits and the second drive module includes N stages of second drive circuits;
the n-th stage first drive circuit is electrically connected to the first end of the (2n-1)-th row of gate line and is configured to provide the gate drive signal to the (2n-1)-th row of gate line;
the n-th stage second drive circuit is electrically connected to the second end of the 2n-th row of gate line and is configured to provide the gate drive signal to the 2nth row of gate lines.

In at least one embodiment of the present disclosure, the first drive module includes N stages of first drive circuits and the second drive module includes N stages of second drive circuits;
the n-th stage first drive circuit is electrically connected to the second end of the (2n-1)-th row of gate line and is configured to provide the gate drive signal to the (2n-1)-th row of gate line;
the n-th stage second drive circuit is electrically connected to the first end of the 2n-th row of gate line and is configured to provide the gate drive signal to the 2nth row of gate lines.

In a specific implementation, the first driving module may include multiple stages of first driving circuits, and the second driving module may include multiple stages of second driving circuits. The n-th stage first driving circuit may be electrically connected to the second end of the odd-row gate lines, and the n-th stage second driving circuit may be electrically connected to the first end of the even-row gate lines.

Optionally, the sub-pixel circuit includes a data writing transistor and a pixel electrode;
the gate of the data writing transistor is electrically connected to the gate line electrically connected to the sub-pixel circuit, the first pole of the data writing transistor is electrically connected to the data line, and the second pole of the data writing transistor is electrically connected to the pixel electrode.

In at least one embodiment of the present disclosure, the sub-pixel circuit may include a data writing transistor and a pixel electrode. The data writing transistor, under control of the gate drive signal provided by the corresponding row gate line, writes the data voltage on the data line to the pixel electrode.

Optionally, the data writing transistor may be a thin film transistor, with the first pole of the data writing transistor being the drain and the second pole being the source, but not limited to this.

The display substrate according to at least one embodiment of the present disclosure includes N rows and M columns of red sub-pixel circuits, N rows and M columns of green sub-pixel circuits, and N rows and M columns of blue sub-pixel circuits;
the odd-column red sub-pixel circuits in the n-th row are electrically connected to the (2n−1)-th row of gate line, and the even-column red sub-pixel circuits in the n-th row are electrically connected to the 2n-th row of gate line;
the odd-column green sub-pixel circuits in the n-th row are electrically connected to the 2n-th row of gate line, and the even-column green sub-pixel circuits in the n-th row are electrically connected to the (2n−1)-th row of gate line;
the odd-column blue sub-pixel circuits in the n-th row are electrically connected to the (2n−1)-th row of gate line, and the even-column blue sub-pixel circuits in the n-th row are electrically connected to the 2n-th row of gate line;
M and N are positive integers, n is a positive integer less than or equal to N.

The display substrate according to at least one embodiment of the present disclosure includes N rows and M columns of red sub-pixel circuits, N rows and M columns of green sub-pixel circuits, and N rows and M columns of blue sub-pixel circuits;

the odd-column red sub-pixel circuits in the n-th row are electrically connected to the 2n-th row of gate line, and the even-column red sub-pixel circuits in the n-th row are electrically connected to the (2n−1)-th row of gate line;

the odd-column green sub-pixel circuits in the n-th row are electrically connected to the (2n−1)-th row of gate line, and the even-column green sub-pixel circuits in the n-th row are electrically connected to the 2n-th row of gate line;

the odd-column blue sub-pixel circuits in the n-th row are electrically connected to the 2n-th row of gate line, and the even-column blue sub-pixel circuits in the n-th row are electrically connected to the (2n−1)-th row of gate line;

M and N are positive integers, n is a positive integer less than or equal to N.

In a specific implementation, according to one implementation method, the display substrate may include multi-row and multi-column red sub-pixel circuits, multi-row and multi-column green sub-pixel circuits, and multi-row and multi-column blue sub-pixel circuits. The odd-column red sub-pixel circuits in the n-th row are electrically connected to the odd-row gate lines, and the even-column red sub-pixel circuits in the n-th row are electrically connected to the even-row gate lines. The odd-column green sub-pixel circuits in the n-th row are electrically connected to the odd-row gate lines, and the even-column green sub-pixel circuits in the n-th row are electrically connected to the even-row gate lines. The odd-column blue sub-pixel circuits in the n-th row are electrically connected to the odd-row gate lines, and the even-column blue sub-pixel circuits in the n-th row are electrically connected to the even-row gate lines.

In a specific implementation, according to another implementation method, the display substrate may include multi-row and multi-column red sub-pixel circuits, multi-row and multi-column green sub-pixel circuits, and multi-row and multi-column blue sub-pixel circuits. The odd-column red sub-pixel circuits in the n-th row are electrically connected to the even-row gate lines, and the even-column red sub-pixel circuits in the n-th row are electrically connected to the odd-row gate lines. The odd-column green sub-pixel circuits in the n-th row are electrically connected to the even-row gate lines, and the even-column green sub-pixel circuits in the n-th row are electrically connected to the odd-row gate lines. The odd-column blue sub-pixel circuits in the n-th row are electrically connected to the even-row gate lines, and the even-column blue sub-pixel circuits in the n-th row are electrically connected to the odd-row gate lines.

In at least one embodiment of the present disclosure, the (2a−1)-th column red sub-pixel circuits in odd rows are electrically connected to the (4a−3)-th column data line, the (2a−1)-th column green sub-pixel circuits in odd rows are electrically connected to the (4a−3)-th column data line, and the (2a−1)-th column blue sub-pixel circuits in odd rows are electrically connected to the (4a−2)-th column data line;

the 2a-th column red sub-pixel circuits in odd rows are electrically connected to the (4a−2)-th column data line, the 2a-th column green sub-pixel circuits in odd rows are electrically connected to the (4a−1)-th column data line, and the 2a-th column blue sub-pixel circuits in odd rows are electrically connected to the (4a−1)-th column data line;

the (2a−1)-th column red sub-pixel circuits in even rows are electrically connected to the (4a−2)-th column data line, the (2a−1)-th column green sub-pixel circuits in even rows are electrically connected to the (4a−2)-th column data line, and the (2a−1)-th column blue sub-pixel circuits in even rows are electrically connected to the (4a−1)-th column data line;

the 2a-th column red sub-pixel circuits in even rows are electrically connected to the (4a−1)-th column data line, the 2a-th column green sub-pixel circuits in even rows are electrically connected to the 4a-th column data line, and the 2a-th column blue sub-pixel circuits in even rows are electrically connected to the 4a-th column data line;

a is a positive integer.

Figure 2A:
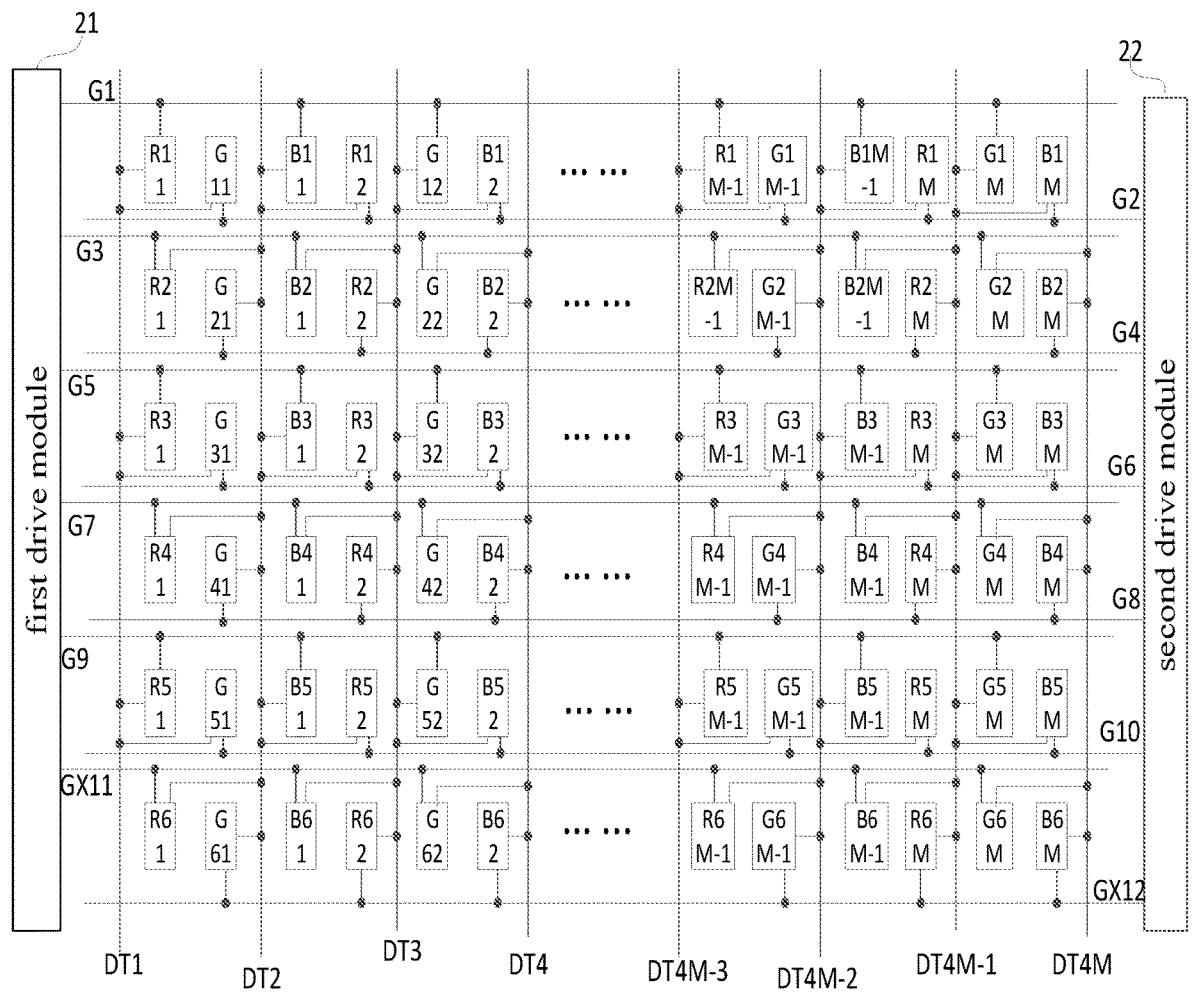
FIG. 2A is a structural diagram of six rows and multiple columns of pixel circuits included in a display substrate according to at least one embodiment of the present disclosure.

The display substrate according to at least one embodiment of the present disclosure includes multi-row and multi-column pixel circuits, and FIG. 2A schematically shows six rows of multi-column sub-pixel circuits in the multi-row and multi-column pixel circuits.

As shown in FIG. 2A, the display substrate according to at least one embodiment of the present disclosed includes a first row first column red sub-pixel circuit R11, a first row first column green sub-pixel circuit G11, a first row first column blue sub-pixel circuit B11, a first row second column red sub-pixel circuit R12, a first row second column green sub-pixel circuit G12, a first row second column blue sub-pixel circuit B12, a first row (M−1)-th column red sub-pixel circuit R1M-1, a first row (M−1)-th column green sub-pixel circuit G1M-1, a first row (M−1)-th column blue sub-pixel circuit B1M-1, a first row M-th column red sub-pixel circuit R1M, a first row M-th column green sub-pixel circuit G1M, and a first row M-th column blue sub-pixel circuit B1M.

The display substrate according to at least one embodiment of the present disclosed includes a second row first column red sub-pixel circuit R21, a second row first column green sub-pixel circuit G21, a second row first column blue sub-pixel circuit B21, a second row second column red sub-pixel circuit R22, a second row second column green sub-pixel circuit G22, a second row second column blue sub-pixel circuit B22, a second row (M−1)-th column red sub-pixel circuit R2M-1, a second row (M−1)-th column green sub-pixel circuit G2M-1, a second row (M−1)-th column blue sub-pixel circuit B2M-1, a second row M-th column red sub-pixel circuit R2M, a second row M-th column green sub-pixel circuit G2M, and a second row M-th column blue sub-pixel circuit B2M.

The display substrate according to at least one embodiment of the present disclosed includes a third row first column red sub-pixel circuit R31, a third row first column green sub-pixel circuit G31, a third row first column blue sub-pixel circuit B31, a third row second column red sub-pixel circuit R32, a third row second column green sub-pixel circuit G32, a third row second column blue sub-pixel circuit B32, a third row (M−1)-th column red sub-pixel circuit R3M-1, a third row (M−1)-th column green sub-pixel circuit G3M-1, a third row (M−1)-th column blue sub-pixel circuit B3M-1, a third row M-th column red sub-pixel circuit R3M, a third row M-th column green sub-pixel circuit G3M, and a third row M-th column blue sub-pixel circuit B3M.

The display substrate according to at least one embodiment of the present disclosed includes a fourth row first column red sub-pixel circuit R41, a fourth row first column green sub-pixel circuit G41, a fourth row first column blue sub-pixel circuit B41, a fourth row second column red sub-pixel circuit R42, a fourth row second column green sub-pixel circuit G42, a fourth row second column blue sub-pixel circuit B42, a fourth row (M−1)-th column red sub-pixel circuit R4M-1, a fourth row (M−1)-th column green sub-pixel circuit G4M-1, a fourth row (M−1)-th column blue sub-pixel circuit B4M-1, a fourth row M-th column red sub-pixel circuit R4M, a fourth row M-th column green sub-pixel circuit G4M, and a fourth row M-th column blue sub-pixel circuit B4M.

The display substrate according to at least one embodiment of the present disclosed includes a fifth row first column red sub-pixel circuit R51, a fifth row first column green sub-pixel circuit G51, a fifth row first column blue sub-pixel circuit B51, a fifth row second column red sub-pixel circuit R52, a fifth row second column green sub-pixel circuit G52, a fifth row second column blue sub-pixel circuit B52, a fifth row (M−1)-th column red sub-pixel circuit R5M-1, a fifth row (M−1)-th column green sub-pixel circuit G5M-1, a fifth row (M−1)-th column blue sub-pixel circuit B5M-1, a fifth row M-th column red sub-pixel circuit R5M, a fifth row M-th column green sub-pixel circuit G5M, and a fifth row M-th column blue sub-pixel circuit B5M.

The display substrate according to at least one embodiment of the present disclosed includes a sixth row first column red sub-pixel circuit R61, a sixth row first column green sub-pixel circuit G61, a sixth row first column blue sub-pixel circuit B61, a sixth row second column red sub-pixel circuit R62, a sixth row second column green sub-pixel circuit G62, a sixth row second column blue sub-pixel circuit B62, a sixth row (M−1)-th column red sub-pixel circuit R6M-1, a sixth row (M−1)-th column green sub-pixel circuit G6M-1, a sixth row (M−1)-th column blue sub-pixel circuit B6M-1, a sixth row M-th column red sub-pixel circuit R6M, a sixth row M-th column green sub-pixel circuit G6M, and a sixth row M-th column blue sub-pixel circuit B6M.

R11 is electrically connected to the first row gate line G1, R12 is electrically connected to the second row gate line G2, G11 is electrically connected to the second row gate line G2, G12 is electrically connected to the first row gate line G1, B11 is electrically connected to the first row gate line G1;

R1M-1 is electrically connected to the first row gate line G1, R1M is electrically connected to the second row gate line G2, G1M-1 is electrically connected to the second row gate line G2, G1M is electrically connected to the first row gate line G1, B1M-1 is electrically connected to the first row gate line G1, B1M is electrically connected to the second row gate line G2;

R11 is electrically connected to the first column data line DT1, G11 is electrically connected to the first column data line DT1, B11 and R12 are electrically connected to the second column data line DT2, G12 and B12 are electrically connected to the third column data line DT3;

R1M-1 is electrically connected to the (4−3)-th column data line DT4M-3, G1M-1 is electrically connected to (4−3)-th column data line DT4M-3, B1M-1 and R1M are electrically connected to the (4M−2)-th column data line DT4M-2, G1M and B1M are electrically connected to the (4M−1)-th column data line DT4M-1;

R21 is electrically connected to the third row gate line G3, G21 is electrically connected to the fourth row gate line G4, B21 is electrically connected to the third row gate line G3, R22 is electrically connected to the fourth row gate line G4, G22 is electrically connected to the third row gate line G3, B22 is electrically connected to the fourth row gate line G4;

R2M-1 is electrically connected to the third row gate line, G2M-1 is electrically connected to the fourth row gate line G4, B2M-1 is electrically connected to the third row gate line G3, R2M is electrically connected to the fourth row gate line G4, G2M is electrically connected to the third row gate G3, B2M is electrically connected to the fourth row gate line G4;

R21 is electrically connected to the second column data line DT2, G21 is electrically connected to the second column data line DT2, B21 and R22 are electrically connected to the third column data line DT3, G22 and B22 are electrically connected to the fourth column data line DT4;

R2M-1 is electrically connected to the (4M−2)-th column data line DT4M-2, G2M-1 is electrically connected to (4M−2)-th column data line DT4M-2, B2M-1 and R2M are electrically connected to the (4M−1)-th column data line DT4M-1, G2M and B2M are electrically connected to the 4M-th column data line DT4M;

R31 is electrically connected to the fifth row gate line G5, G31 is electrically connected to the sixth row gate line G6, B31 is electrically connected to the fifth row gate line G5, R32 is electrically connected to the sixth row gate line G6, G32 is electrically connected to the fifth row gate line G5, B32 is electrically connected to the sixth row gate line G6;

R3M-1 is electrically connected to the fifth row gate line G5, G3M-1 is electrically connected to the sixth row gate line G6, B3M-1 is electrically connected to the fifth row gate line G5, R3M is electrically connected to the sixth row gate line G6, G3M is electrically connected to the fifth row gate line G5, B3M is electrically connected to the sixth row gate line G6;

R31 is electrically connected to the first column data line DT1, G31 is electrically connected to the first column data line DT1, B31 and R32 are electrically connected to the second column data line DT2, G32 and B32 are electrically connected to the third column data line DT3;

R3M-1 is electrically connected to the (4−3)-th column data line DT4M-3, G3M-1 is electrically connected to (4−3)-th column data line DT4M-3, B3M-1 and R3M are electrically connected to the (4M−2)-th column data line DT4M-2, G3M and B3M are electrically connected to the (4M−1)-th column data line DT4M-1;

R41 is electrically connected to the seventh row gate line G7, G41 is electrically connected to the eighth row gate line G8, B41 is electrically connected to the seventh row gate line G7, R42 is electrically connected to the eighth row gate line G8, G42 is electrically connected to the seventh row gate line G7, B42 is electrically connected to the eighth row gate line G8;

R4M-1 is electrically connected to the seventh row gate line G7, G4M-1 is electrically connected to the eighth row gate line G8, B4M-1 is electrically connected to the seventh row gate line G7, R4M is electrically connected to the eighth row gate line G8, G4M is electrically connected to the seventh row gate line G7, B4M is electrically connected to the eighth row gate line G8;

R41 is electrically connected to the second column data line DT2, G41 is electrically connected to the second column data line DT2, B41 and R42 are electrically connected to the third column data line DT3, G42 and B42 are electrically connected to the fourth column data line DT4;

R4M-1 is electrically connected to the (4M−2)-th column data line DT4M-2, G4M-1 is electrically connected to (4M−2)-th column data line DT4M-2, B4M-1 and R4M are electrically connected to the (4M−1)-th column data line DT4M-1, G4M and B4M are electrically connected to the 4M-th column data line DT4M;

R51 is electrically connected to the ninth row gate line G9, G51 is electrically connected to the tenth row gate line G10, B51 is electrically connected to the ninth row gate line G9, R52 is electrically connected to the tenth row gate line G10, G52 is electrically connected to the ninth row gate line G9, B52 is electrically connected to the tenth row gate line G10;

R5M-1 is electrically connected to the ninth row gate line G9, G5M-1 is electrically connected to the tenth row gate line G10, B5M-1 is electrically connected to the ninth row gate line G9, R5M is electrically connected to the tenth row gate line G10, G5M is electrically connected to the ninth row gate line G9, B5M is electrically connected to the tenth row gate line G10;

R51 is electrically connected to the first column data line DT1, G51 is electrically connected to the first column data line DT1, B51 and R52 are electrically connected to the second column data line DT2, G52 and B52 are electrically connected to the third column data line DT3;

R5M-1 is electrically connected to the (4−3)-th column data line DT4M-3, G5M-1 is electrically connected to (4−3)-th column data line DT4M-3, B5M-1 and R5M are electrically connected to the (4M−2)-th column data line DT4M-2, G5M and B5M are electrically connected to the (4M−1)-th column data line DT4M-1;

R61 is electrically connected to the eleventh row gate line GX11, G61 is electrically connected to the twelfth row gate line GX12, B61 is electrically connected to the eleventh row gate line GX11, R62 is electrically connected to the twelfth row gate line GX12, G62 is electrically connected to the eleventh row gate line GX11, B62 is electrically connected to the twelfth row gate line GX12;

R6M-1 is electrically connected to the eleventh row gate line GX11, G6M-1 is electrically connected to the twelfth row gate line GX12, B6M-1 is electrically connected to the eleventh row gate line GX11, R6M is electrically connected to the twelfth row gate line GX12, G6M is electrically connected to the eleventh row gate line GX11, B6M is electrically connected to the twelfth row gate line GX12;

R61 is electrically connected to the second column data line DT2, G61 is electrically connected to the second column data line DT2, B61 and R62 are electrically connected to the third column data line DT3, G62 and B62 are electrically connected to the fourth column data line DT4;

R6M-1 is electrically connected to the (4M−2)-th column data line DT4M-2, G6M-1 is electrically connected to (4M−2)-th column data line DT4M-2, B6M-1 and R6M are electrically connected to the (4M−1)-th column data line DT4M-1, G6M and B6M are electrically connected to the 4M-th column data line DT4M;

M is a positive integer.

As above, each sub-pixel circuit is set in the display area. The display substrate further includes a first drive module and a second drive module;

the first drive module 21 is set to the left of the display area, and the second drive module 22 is set to the right of the display area;

the first drive module 21 is respectively electrically connected to the left ends of the first row gate line G1, the third row gate line G3, the fifth row gate line G5, the seventh row gate line G7, the ninth row gate line G9, and the eleventh row gate line GX11 and it is configured to provide a first row gate drive signal to G1, a third row gate drive signal to G3, a fifth row gate drive signal to G5, a seventh row gate drive signal to G7, a ninth row gate drive signal to G9, and an eleventh row gate drive signal to G11;

the second drive module 22 is respectively electrically connected to the right ends of the second row gate line G2, the fourth row gate line G4, the sixth row gate line G6, the eighth row gate line G8, the tenth row gate line G10, and the twelfth row gate line GX12 and it is configured to provide a second row gate drive signal to G2, a fourth row gate drive signal to G4, a sixth row gate drive signal to G6, an eighth row gate drive signal to G8, a tenth row gate drive signal to G10, and a twelfth row gate drive signal to G12.

In at least one embodiment of the display substrate shown in FIG. 2A of the present disclosure, when the six-row multi-column pixel circuit is in operation, the same color group is alternately controlled by odd-row gate lines and even-row gate lines, that is, in the display area, the same color group is evenly bright and dark in any area. Under grayscale screens, spatially, different color groups can be averaged in brightness and darkness, and there will be no phenomenon of half red and half green. This pixel architecture has better picture quality.

In the six-row multi-column pixel circuit of at least one embodiment of the display substrate shown in FIG. 2A of the present disclosure, DT1 is electrically connected to R11 and G11, and both R11 and G11 are located to the right of DT1; R11 and G11 are located between DT1 and DT2;

DT1 is electrically connected to R31 and G31, and both R31 and G31 are located to the right of DT1; R31 and G31 are located between DT1 and DT2;

DT1 is electrically connected to R51 and G51, and both R31 and G31 are located to the right of DT1; R51 and G51 are located between DT1 and DT2;

DT2 is electrically connected to B11 and R12, and both B11 and R12 are located to the right of DT2; B11 and R12 are located between DT2 and DT3;

DT2 is electrically connected to R21 and G21, and both R21 and G21 are located to the left of DT2; R21 and G21 are located between DT1 and DT2;

DT2 is electrically connected to B31 and R32, and both B31 and R32 are located to the right of DT2; B31 and R32 are located between DT2 and DT3;

DT2 is electrically connected to R41 and G41, and both R41 and G41 are located to the left of DT2; R41 and G41 are located between DT1 and DT2;

DT2 is electrically connected to B51 and R52, and both B51 and R52 are located to the right of DT2; B51 and R52 are located between DT2 and DT3;

DT2 is electrically connected to R61 and G61, and both R61 and G61 are located to the left of DT2; R61 and G61 are located between DT1 and DT2;

DT3 is electrically connected to G12 and B12, and both G12 and B12 are located to the right of DT3; G12 and B12 are located between DT3 and DT4;

DT3 is electrically connected to B21 and R22, and both B21 and R22 are located to the left of DT3; B21 and R22 are located between DT3 and DT4;

DT3 is electrically connected to G32 and B32, and both G32 and B32 are located to the right of DT3; G32 and B32 are located between DT3 and DT4;

DT3 is electrically connected to B41 and R42, and both B41 and R42 are located to the left of DT3; B41 and R42 are located between DT3 and DT4.

DT3 is electrically connected to G52 and B52, and both G52 and B52 are located to the right of DT3; G52 and B52 are located between DT3 and DT4;

DT3 is electrically connected to B61 and R62, and both B61 and R62 are located to the left of DT3; B61 and R62 are located between DT3 and DT4.

DT4 is electrically connected to G22 and B22, and both G22 and B22 are located to the left of DT4; G22 and B22 are located between DT3 and DT4;

DT4 is electrically connected to G42 and B42, and both G42 and B42 are located to the left of DT4; G42 and B42 are located between DT3 and DT4;

DT4 is electrically connected to G62 and B62, and both G62 and B62 are located to the left of DT4; G62 and B62 are located between DT3 and DT4;

DT4M-3 is electrically connected to R1M-1 and G1M-1, R1M-1 and G1M-1 are located to the right of DT4M-3; R1M-1 and G1M-1 are located between DT4M-3 and DT4M-2;

DT4M-3 is electrically connected to R3M-1 and G3M-1, R3M-1 and G3M-1 are located to the right of DT4M-3; R3M-1 and G3M-1 are located between DT4M-3 and DT4M-2;

DT4M-3 is electrically connected to R5M-1 and G5M-1, R5M-1 and G5M-1 are located to the right of DT4M-3; R3M-1 and G3M-1 are located between DT4M-3 and DT4M-2;

DT4M-2 is electrically connected to B1M-1 and R1M, B1M-1 and R1M are located to the right of DT4M-2; B1M-1 and R1M are located between DT4M-2 and DT4M-1;

DT4M-2 is electrically connected to R2M-1 and G2M-1, R2M-1 and G2M-1 are located to the left of DT4M-2; R2M-1 and G2M-1 are located between DT4M-3 and DT4M-2;

DT4M-2 is electrically connected to B3M-1 and R3M, B3M-1 and R3M are located to the right of DT4M-2; B3M-1 and R3M are located between DT4M-2 and DT4M-1;

DT4M-2 is electrically connected to R4M-1 and G4M-1, R4M-1 and G4M-1 are located to the left of DT4M-2; R4M-1 and G4M-1 are located between DT4M-3 and DT4M-2;

DT4M-2 is electrically connected to B5M-1 and R5M, B5M-1 and R5M are located to the right of DT4M-2; B5M-1 and R5M are located between DT4M-2 and DT4M-1;

DT4M-2 is electrically connected to R6M-1 and G6M-1, R6M-1 and G6M-1 are located to the left of DT4M-2. R6M-1 and G6M-1 are located between DT4M-3 and DT4M-2.

DT4M-1 is electrically connected to G1M and B1M, G1M and B1M are located to the right of DT4M-1; G1M and BM are located between DT4M-1 and DT4M;

DT4M-1 is electrically connected to B2M-1 and R2M, B2M-1 and R2M are located to the left of DT4M-1; B2M-1 and R2M are located between DT4M-2 and DT4M-1;

DT4M-1 is electrically connected to G3M and B3M, G3M and B3M are located to the right of DT4M-1; G3M and B3M are located between DT4M-1 and DT4M;

DT4M-1 is electrically connected to B4M-1 and R4M, B4M-1 and R4M are located to the left of DT4M-1; B4M-1 and R4M are located between DT4M-2 and DT4M-1;

DT4M-1 is electrically connected to G5M and B5M, G5M and B5M are located to the right of DT4M-1; G5M and B5M are located between DT4M-1 and DT4M;

DT4M-1 is electrically connected to B6M-1 and R6M, B6M-1 and R6M are located to the left of DT4M-1; B6M-1 and R6M are located between DT4M-2 and DT4M-1;

DT4M is electrically connected to G2M and B2M, G2M and B2M are located to the left of DT4M; G2M and B2M are located between DT4M-1 and DT4M;

DT4M is electrically connected to G4M and B4M, G4M and B4M are located to the left of DT4M; G4M and B4M are located between DT4M-1 and DT4M;

DT4M is electrically connected to G6M and B6M, G6M and B6M are located to the left of DT4M; G6M and B6M are located between DT4M-1 and DT4M.

Figure 3:
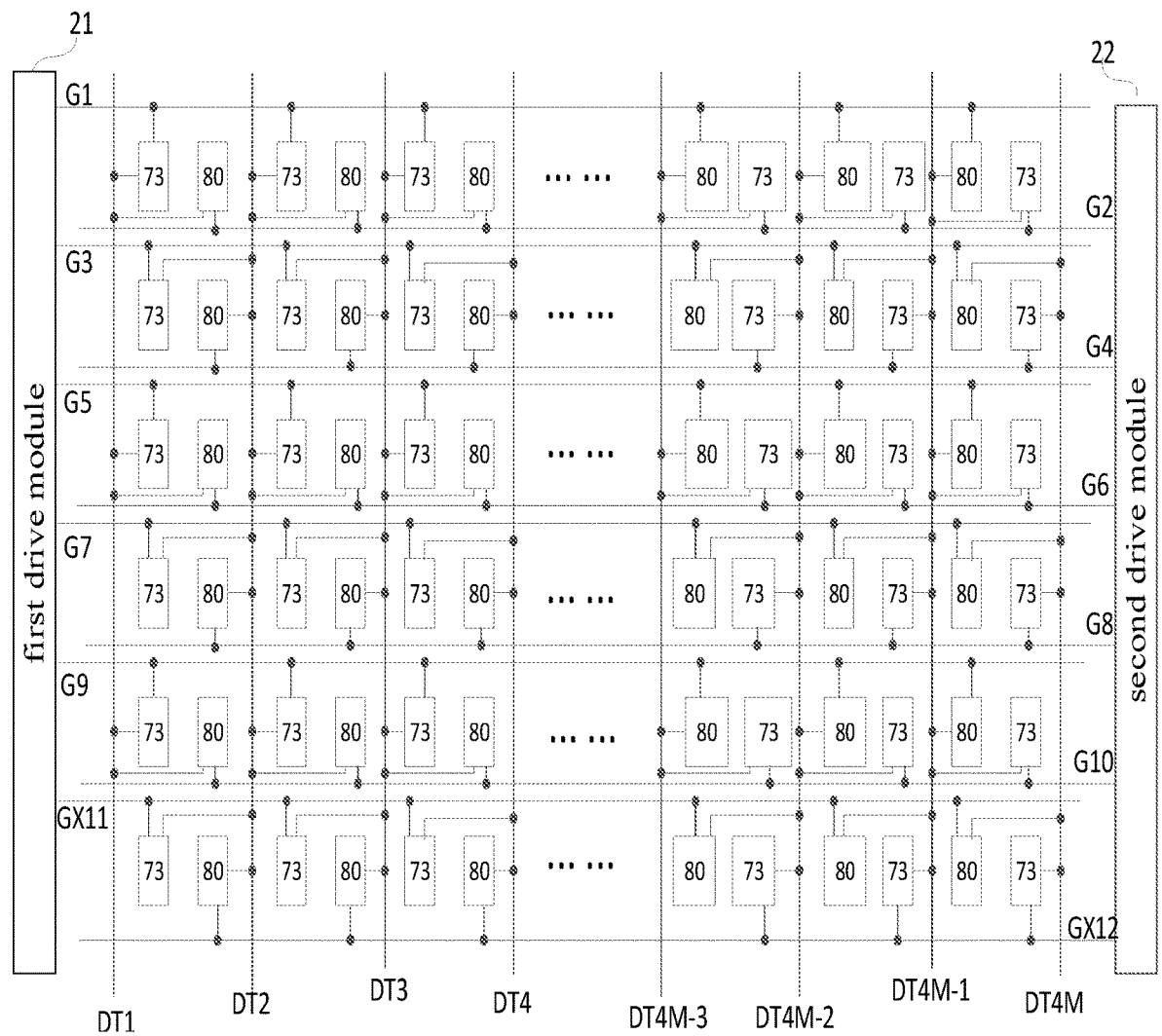
FIG. 3 is a schematic diagram showing an actual gray scale of each sub-pixel circuit under a gray scale L80 display screen when at least one embodiment of the display substrate shown in FIG. 2A of the present disclosure is in operation.

In at least one embodiment of the display substrate shown in FIG. 2A of the present disclosure, when the display substrate is in operation, under grayscale L80 display screens, the actual grayscale of each sub-pixel circuit is shown in FIG. 3.

In at least one embodiment of the present disclosure, the display substrate adopts a Dual Gate (double gate) and GOA cross-driving method, wherein the red sub-pixel circuit, green sub-pixel circuit, and blue sub-pixel circuit are all alternately controlled by adjacent odd and even row gate lines. The first drive module and the second drive module are independent of each other, with the first drive module outputting an odd-row gate drive signal and the second drive module outputting an even-row gate drive signal. For GOA cross-drive products, the near-end delay of each gate line is less than the far-end delay, resulting in a larger $\Delta Vp$ at the near-end than at the far-end. Macroscopically, this is reflected as pixels at the far-end being brighter than those at the near-end. Since the same color group is alternately controlled by odd and even row gate lines, the same color group is evenly bright and dark in any area. Under grayscale screens, spatially, different color groups can be averaged in brightness and darkness, and there will be no phenomenon of half red and half green. On the premise that the pixel aperture ratio is greater than 50%, through size scanning, the size that can be supported by the display substrate according to at least one embodiment of the present disclosure can reach 27 inches (resolution of 1920×100), but not limited to this.

For the Dual Gate double-sided cross-drive design, when the connection relationship between each sub-pixel circuit and the first drive module, the second drive module, and each row gate line is as shown in FIG. 2A, there will be no half-red and half-green problem under grayscale screens. The pixel architecture shown in FIG. 2A is suitable for higher size MNT (monitor) Dual Gate narrow bezel design.

After testing, when the pixel architecture is as shown in FIG. 2A, the thickness of the gate metal layer is 3500 Å (angstroms), the thickness of the insulating layer between the first conductive layer and the second conductive layer is 6000 Å (angstroms), the aperture ratio is 49%, the Charging Ratio is 99.2%, and the display panel is an 18.5-inch FHD (Full HD) display panel, there will be no half-red and half-green problem under grayscale screens;

When the pixel architecture is as shown in FIG. 2A, the thickness of the gate metal layer is 6100 Å (angstroms), the thickness of the insulating layer between the first conductive layer and the second conductive layer is 6000 Å (angstroms), the aperture ratio is 50%, the Charging Ratio is 98.5%, and the display panel is a 27-inch FHD (Full HD) display panel, there will be no half-red and half-green problem under grayscale screens.

Figure 2B:
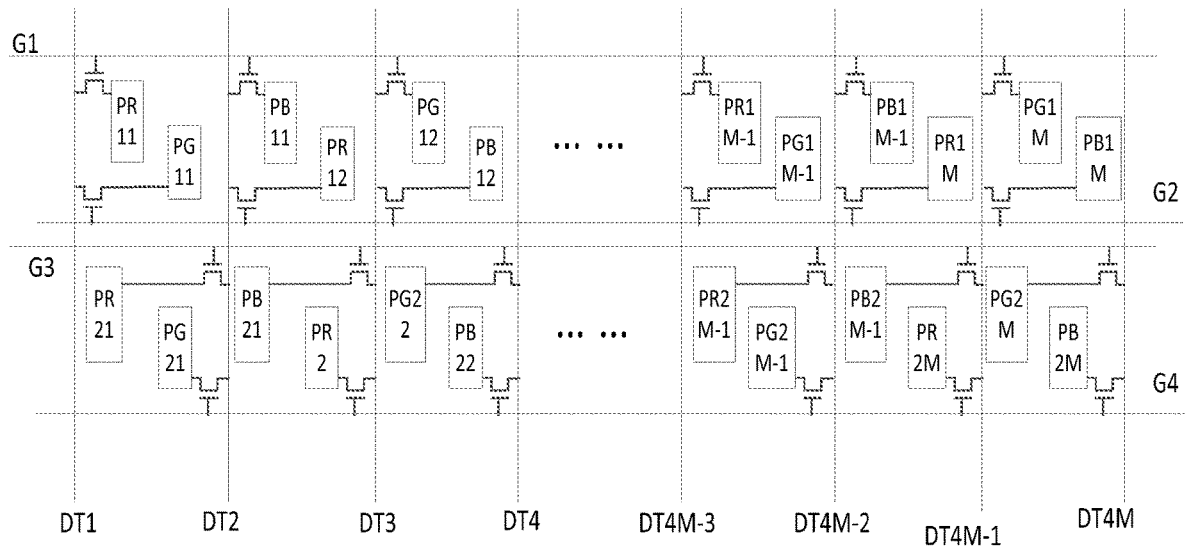
FIG. 2B is a structural diagram of pixel electrodes and thin film transistors included in each of sub-pixel circuits in a first row and sub-pixel circuits in a second row in FIG. 2A.

FIG. 2B is a structural diagram of sub-pixel circuits in a first row and sub-pixel circuits in a second row in FIG. 2A including pixel electrodes and thin film transistors.

In FIG. 2B, the label PR11 is the pixel electrode included in the red sub-pixel circuit in the first row and first column, the label PG11 is the pixel electrode included in the green sub-pixel circuit in the first row and first column, and the label PB11 is the pixel electrode included in the blue sub-pixel circuit in the first row and first column. The label PR12 is the pixel electrode included in the red sub-pixel circuit in the first row and second column, the label PG12 is the pixel electrode included in the green sub-pixel circuit in the first row and second column, and the label PB12 is the pixel electrode included in the blue sub-pixel circuit in the first row and second column;

The label PR1M-1 is the pixel electrode included in the red sub-pixel circuit in the first row and M−1 column, the label PG1M-1 is the pixel electrode included in the green sub-pixel circuit in the first row and M−1 column, and the label PB1M-1 is the pixel electrode included in the blue sub-pixel circuit in the first row and M−1 column. The label PR1M is the pixel electrode included in the red sub-pixel circuit in the first row and M column, the label PG1M is the pixel electrode included in the green sub-pixel circuit in the first row and M column, and the label PB1M is the pixel electrode included in the blue sub-pixel circuit in the first row and M column;

The label PR21 is the pixel electrode included in the red sub-pixel circuit in the second row and first column, the label PG21 is the pixel electrode included in the green sub-pixel circuit in the second row and first column, and the label PB21 is the pixel electrode included in the blue sub-pixel circuit in the second row and first column. The label PR22 is the pixel electrode included in the red sub-pixel circuit in the second row and second column, the label PG22 is the pixel electrode included in the green sub-pixel circuit in the second row and second column, and the label PB22 is the pixel electrode included in the blue sub-pixel circuit in the second row and second column;

The label PR2M-1 is the pixel electrode included in the red sub-pixel circuit in the second row and M−1 column, the label PG2M-1 is the pixel electrode included in the green sub-pixel circuit in the second row and M−1 column, and the label PB2M-1 is the pixel electrode included in the blue sub-pixel circuit in the second row and M−1 column. The label PR2M is the pixel electrode included in the red sub-pixel circuit in the second row and M column, the label PG2M is the pixel electrode included in the green sub-pixel circuit in the second row and M column, and the label PB2M is the pixel electrode included in the blue sub-pixel circuit in the second row and M column.

Figure 2C:
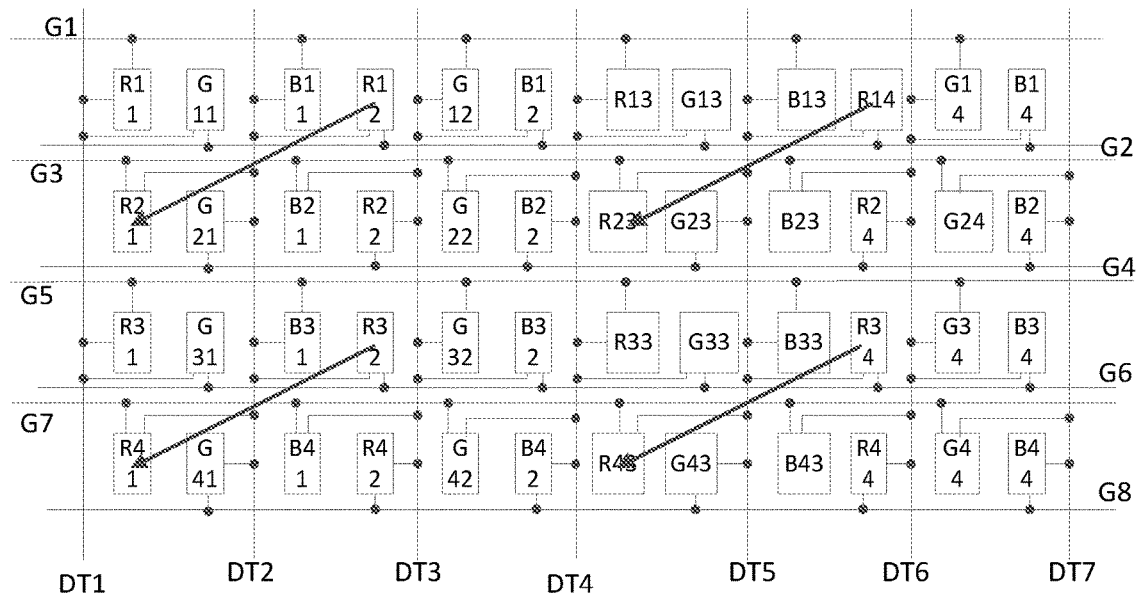
FIG. 2C is a schematic diagram showing charging of at least one embodiment of the display substrate shown in FIG. 2A under a monochrome red screen.
Figure 2D:
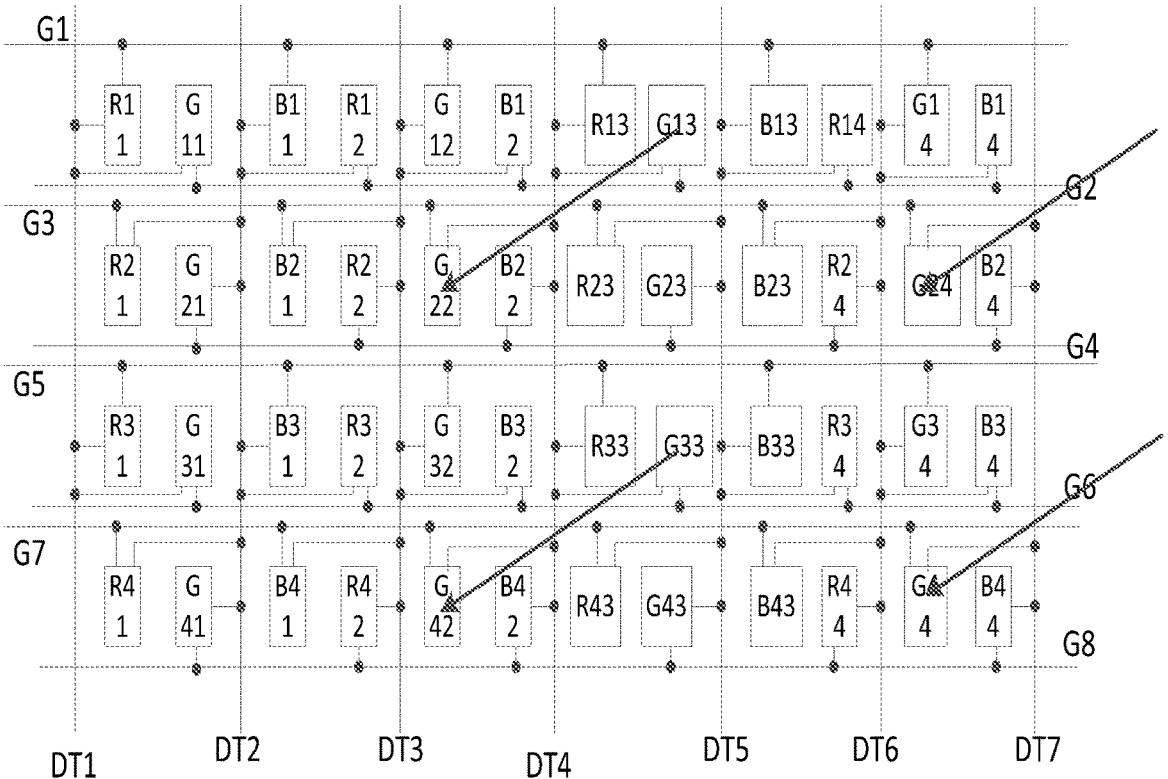
FIG. 2D is a schematic diagram showing charging of at least one embodiment of the display substrate shown in FIG. 2A under a monochrome green screen.
Figure 2E:
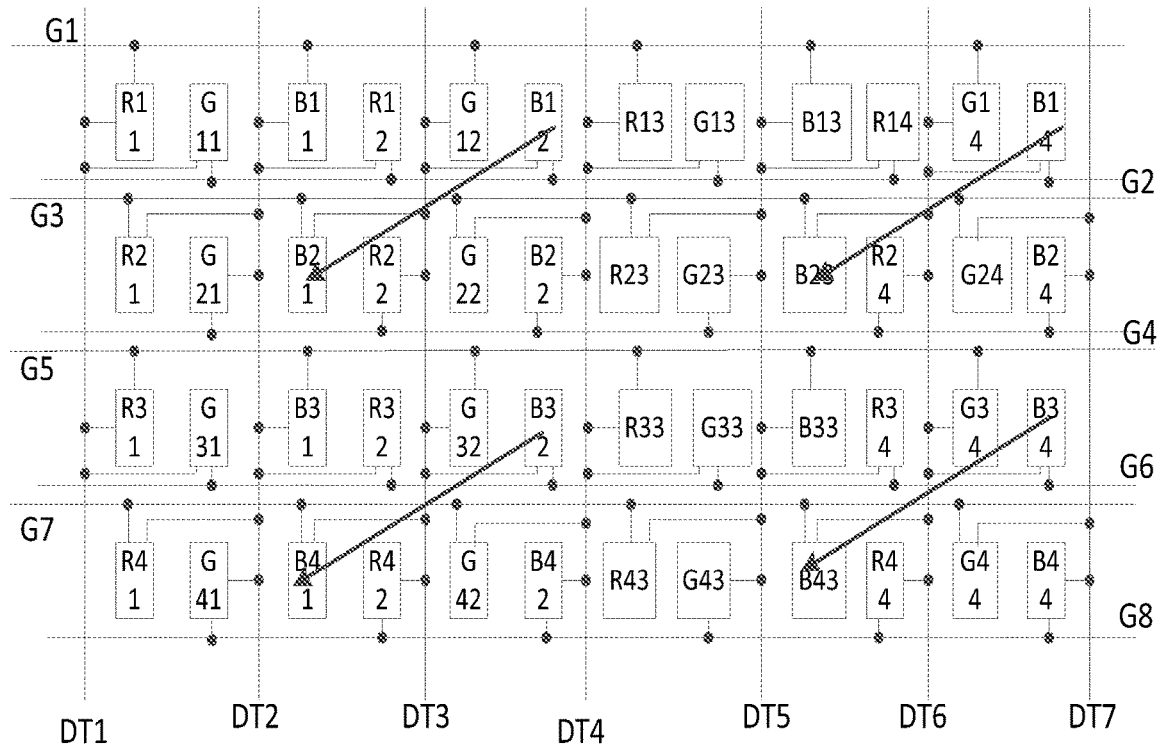
FIG. 2E is a schematic diagram showing charging of at least one embodiment of the display substrate shown in FIG. 2A under a monochrome blue screen.

FIG. 2C is a charging schematic diagram of at least one embodiment of the display substrate shown in FIG. 2A under a monochrome red screen. As shown in FIG. 2C, the red sub-pixel circuits in the even rows and 2n−1 columns are pre-charged; n is a positive integer;

FIG. 2D is a charging schematic diagram of at least one embodiment of the display substrate shown in FIG. 2A under a monochrome green screen. As shown in FIG. 2D, the green sub-pixels in the even rows and 2n columns are pre-charged;

FIG. 2E is a charging schematic diagram of at least one embodiment of the display substrate shown in FIG. 2A under a monochrome blue screen. As shown in FIG. 2E, the blue sub-pixels in the even rows and 2n−1 columns are pre-charged;

After testing, when using at least one embodiment of the display substrate shown in FIG. 2A, when the display product is an 18.5-inch FHD display product, no obvious visible Fine Pitch (one row bright and one row dark) defects were found under a monochrome screen.

In FIGS. 2C, 2D, and 2E, the label R13 is the red sub-pixel circuit in the first row and third column, the label G13 is the green sub-pixel circuit in the first row and third column, and the label B13 is the blue sub-pixel circuit in the first row and third column. The label R14 is the red sub-pixel circuit in the first row and fourth column, the label G14 is the green sub-pixel circuit in the first row and fourth column, and the label B14 is the blue sub-pixel circuit in the first row and fourth column;

The label R23 is the red sub-pixel circuit in the second row and third column, the label G23 is the green sub-pixel circuit in the second row and third column, and the label B23 is the blue sub-pixel circuit in the second row and third column. The label R24 is the red sub-pixel circuit in the second row and fourth column, the label G24 is the green sub-pixel circuit in the second row and fourth column, and the label B24 is the blue sub-pixel circuit in the second row and fourth column;

The label R33 is the red sub-pixel circuit in the third row and third column, the label G33 is the green sub-pixel circuit in the third row and third column, and the label B33 is the blue sub-pixel circuit in the third row and third column. The label R34 is the red sub-pixel circuit in the third row and fourth column, the label G34 is the green sub-pixel circuit in the third row and fourth column, and the label B34 is the blue sub-pixel circuit in the third row and fourth column;

The label R43 is the red sub-pixel circuit in the fourth row and third column, the label G43 is the green sub-pixel circuit in the fourth row and third column, and the label B43 is the blue sub-pixel circuit in the fourth row and third column. The label R44 is the red sub-pixel circuit in the fourth row and fourth column, the label G44 is the green sub-pixel circuit in the fourth row and fourth column, and the label B44 is the blue sub-pixel circuit in the fourth row and fourth column;

The label DT5 is the data line in the fifth column, the label DT6 is the data line in the sixth column, and the label DT7 is the data line in the seventh column.

In at least one embodiment of the present disclosure, the first drive circuit is also electrically connected to a corresponding first output clock signal line and is configured to provide a first output clock signal on the first output clock signal line to the gate line electrically connected to the first drive circuit under control of a potential of a corresponding first pull-up node;

the second drive circuit is also electrically connected to a corresponding second output clock signal line and is configured to provide a second output clock signal on the second output clock signal line to the gate line electrically connected to the second drive circuit under control of a potential of a corresponding second pull-up node.

Figure 4:
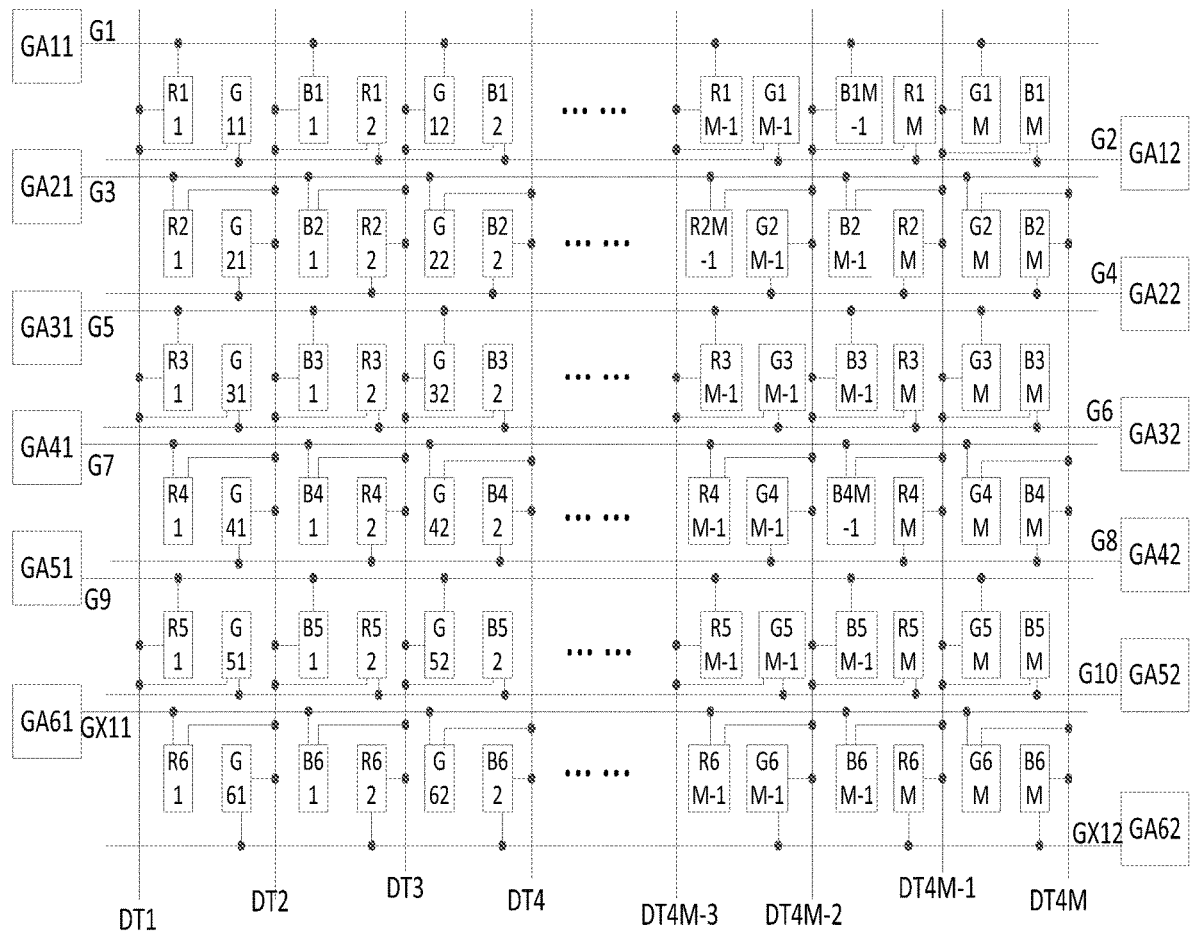
FIG. 4 is a structural diagram of a display substrate according to at least one embodiment of the present disclosure.

As shown in FIG. 4, the first drive module may include a first-level first drive circuit GA11, a second-level first drive circuit GA21, a third-level first drive circuit GA31, a fourth-level first drive circuit GA41, a fifth-level first drive circuit GA51, and a sixth-level first drive circuit GA61.

GA11 is electrically connected to the left end of G1, GA21 is electrically connected to the left end of G3, GA31 is electrically connected to the left end of G5, GA41 is electrically connected to the left end of G7, GA51 is electrically connected to the left end of G9, and GA61 is electrically connected to the left end of G11.

The second drive module may include a first-level second drive circuit GA12, a second-level second drive circuit GA22, a third-level second drive circuit GA32, a fourth-level second drive circuit GA42, a fifth-level second drive circuit GA52, and a sixth-level second drive circuit GA62.

GA12 is electrically connected to the right end of G2, GA22 is electrically connected to the right end of G4, GA32 is electrically connected to the right end of G6, GA42 is electrically connected to the right end of G8, GA52 is electrically connected to the right end of G10, and GA62 is electrically connected to the right end of G12.

In at least one embodiment of the present disclosure, GA11 is electrically connected to the first-level left-side output clock signal line and outputs a corresponding gate drive signal according to the first-level left-side output clock signal provided by the first-level left-side output clock signal line;

GA21 is electrically connected to the second-level left-side output clock signal line and outputs a corresponding gate drive signal according to the second-level left-side output clock signal provided by the second-level left-side output clock signal line;

GA31 is electrically connected to the third-level left-side output clock signal line and outputs a corresponding gate drive signal according to the third-level left-side output clock signal provided by the third-level left-side output clock signal line;

GA41 is electrically connected to the fourth-level left-side output clock signal line and outputs a corresponding gate drive signal according to the fourth-level left-side output clock signal provided by the fourth-level left-side output clock signal line;

GA51 is electrically connected to the fifth-level left-side output clock signal line and outputs a corresponding gate drive signal according to the fifth-level left-side output clock signal provided by the fifth-level left-side output clock signal line;

GA61 is electrically connected to the sixth-level left-side output clock signal line and outputs a corresponding gate drive signal according to the sixth-level left-side output clock signal provided by the sixth-level left-side output clock signal line;

GA12 is electrically connected to the first-level right-side output clock signal line and outputs a corresponding gate drive signal according to the first-level right-side output clock signal provided by the first-level right-side output clock signal line;

GA22 is electrically connected to the second-level right-side output clock signal line and outputs a corresponding gate drive signal according to the second-level right-side output clock signal provided by the second-level right-side output clock signal line;

GA32 is electrically connected to the third-level right-side output clock signal line and outputs a corresponding gate drive signal according to the third-level right-side output clock signal provided by the third-level right-side output clock signal line;

GA42 is electrically connected to the fourth-level right-side output clock signal line and outputs a corresponding gate drive signal according to the fourth-level right-side output clock signal provided by the fourth-level right-side output clock signal line;

GA52 is electrically connected to the fifth-level right-side output clock signal line and outputs a corresponding gate drive signal according to the fifth-level right-side output clock signal provided by the fifth-level right-side output clock signal line;

GA62 is electrically connected to the sixth-level right-side output clock signal line and outputs a corresponding gate drive signal according to the sixth-level right-side output clock signal provided by the sixth-level right-side output clock signal line;

The input end of GA11 is electrically connected to the left-side start signal line, and the input end of GA21 is electrically connected to the right-side start signal line.

Figure 5:
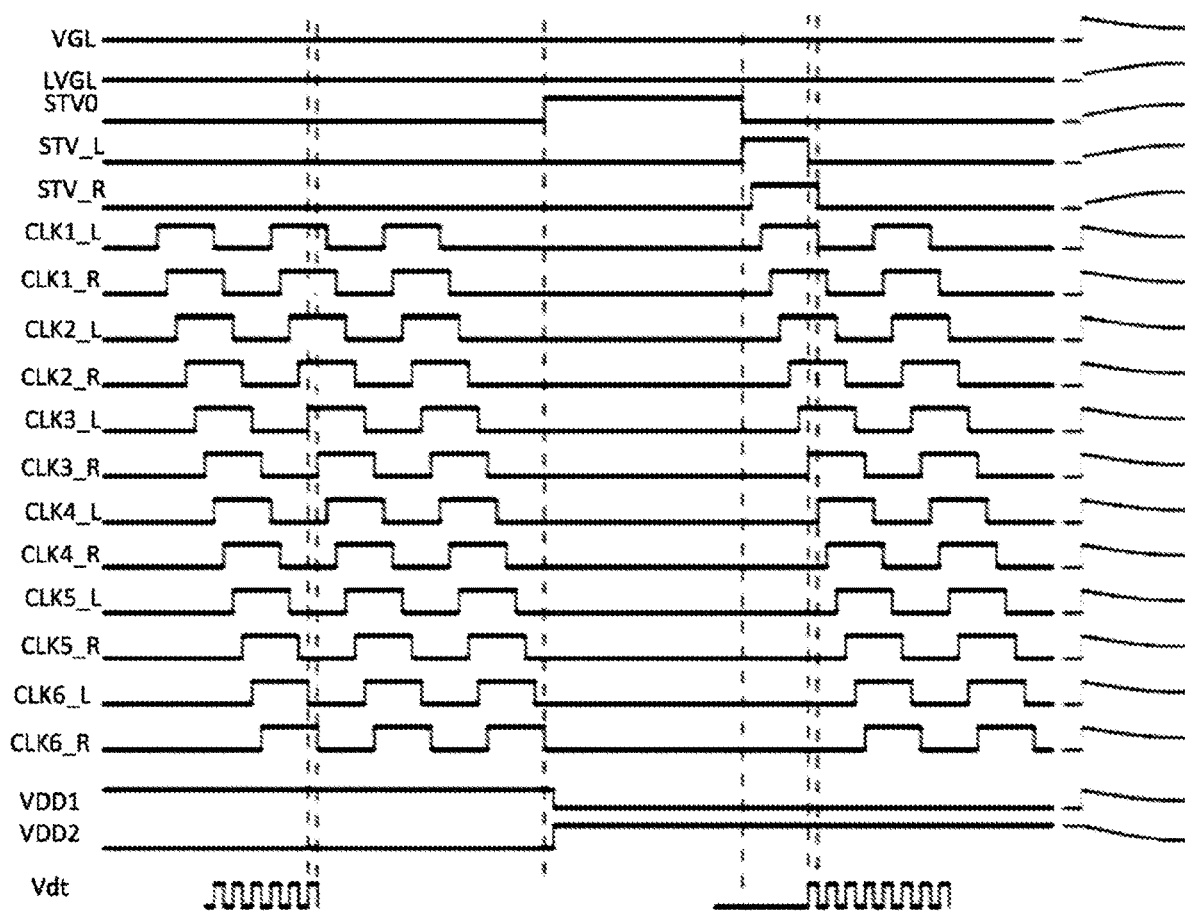
FIG. 5 is a diagram showing waveforms of signals provided by signal lines of a first drive module and a second drive module.

FIG. 5 is a waveform diagram of signals provided by signal lines of a first drive module and a second drive module.

In FIG. 5, the label VGL is the first low voltage signal, the label LVGL is the second low voltage signal, the label STV0 is the frame start signal, the label STV_L is the left-side start signal line, the label STV_R is the right-side start signal line. The label CLK1_L is the first-level left-side output clock signal line, the label CLK1_R is the first-level right-side output clock signal line, the label CLK2_L is the second-level left-side output clock signal line, the label CLK2_R is the second-level right-side output clock signal line, the label CLK3_L is the third-level left-side output clock signal line, and the label CLK3_R is the upper-level right-side output clock signal line, the label CLK4_L is the fourth-level left-side output clock signal line, the label CLK4_R is the fourth-level right-side output clock signal line, the label CLK5_L is the fifth-level left-side output clock signal line, the label CLK5_R is the fifth-level right-side output clock signal line, the label CLK6_L is the sixth-level left-side output clock signal line, and the label CLK6_R is the sixth-level right-side output clock signal line. The label VDD1 is the first control voltage terminal, the label VDD2 is the second control voltage terminal, and the label Vdt is the data voltage.

The display substrate according to at least one embodiment of the present disclosure further includes a first resistor and a second resistor;

the first resistor is electrically connected to the first output clock signal line;

the second resistor is electrically connected to the second output clock signal line.

In a specific implementation, the first resistor electrically connected to the first output clock signal line and the second resistor electrically connected to the second output clock signal line can be set. By increasing the RC Delay (resistor-capacitor delay) of the gate line, the ΔVp difference between the near-end pixels and the far-end pixels electrically connected to the gate line can be reduced, thereby improving the image quality.

Figure 6:
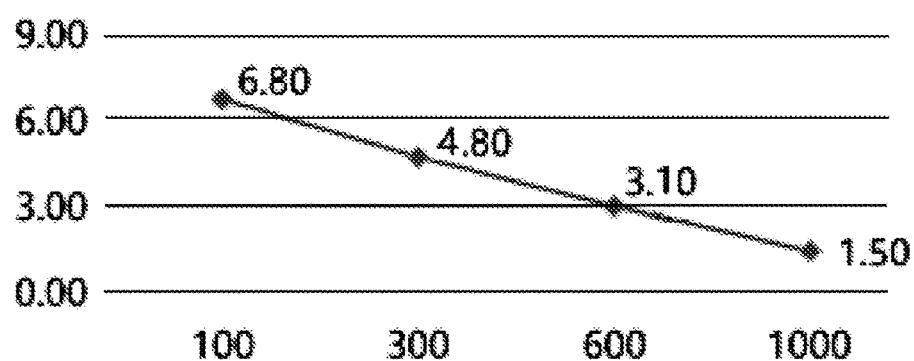
FIG. 6 is a diagram showing relationship between resistance values of a first resistor and a second resistor and grayscale difference values when displaying a grayscale L80 screen, with addition of the first resistor and the second resistor, as simulated by simulation software.

FIG. 6 is a diagram showing the relationship between resistance values of a first resistor and a second resistor and grayscale difference values when displaying a grayscale L80 screen, with addition of a first resistor and a second resistor, as simulated by simulation software. At this time, the thickness of the gate metal layer is 3500 Å (angstroms), and the thickness of the insulating layer between the first conductive layer and the second conductive layer can be 6000 Å (angstroms).

As can be seen from FIG. 6, when the resistance values of the first resistor and the second resistor are 1 KΩ, the gray scale difference value between the far-end pixels and the near-end pixels is within 1.5 gray scales.

In FIG. 6, the horizontal axis represents the resistance values of the first resistor and the second resistor, in volts (V), and the vertical axis represents the gray scale difference values between the far-end pixels and near-end pixels, in ohms.

Optionally, the resistance value of the first resistor and the resistance value of the second resistor are greater than a resistance value threshold.

In at least one embodiment of the present disclosure, the resistance value threshold can be 300 ohms, but is not limited to this. The resistance value threshold can be selected according to actual conditions.

The display substrate according to at least one embodiment of the present disclosure includes a gate metal layer disposed on the base substrate;
the gate lines are formed in the gate metal layer;
the thickness of the gate metal layer is greater than a first thickness threshold.

In a specific implementation, by changing process parameters and increasing the thickness of the gate metal layer, the RC Delay difference between the near-end and far-end can be reduced.

In at least one embodiment of the present disclosure, the first thickness threshold can be, for example, 4500 Å (angstroms), but is not limited to this. In actual operation, the first thickness threshold can be selected according to actual conditions. For example, the thickness of the gate metal layer can be set to 5000 Å (angstroms).

In at least one embodiment of the present disclosure, the display module further includes a common electrode; the display substrate further includes a first conductive layer, an insulating layer, and a second conductive layer, which are sequentially layered along a direction away from the base substrate;
the pixel electrode is formed in the first conductive layer, and the common electrode is formed in the second conductive layer;
the thickness of the insulating layer is less than a second thickness threshold.

Optionally, the insulating layer can be a passivation layer, but is not limited to this.

In a specific implementation, the thickness of the insulating layer can be reduced to reduce the RC Delay difference between the near-end and far-end.

In at least one embodiment of the present disclosure, the second thickness threshold can be, for example, 4000 Å (angstroms), but is not limited to this. In actual operation, the second thickness threshold can be selected according to actual conditions. For example, the thickness of the insulating layer can be set to 3000 Å (angstroms).

In a specific implementation, by increasing the thickness of the gate metal layer and reducing the thickness of the insulating layer, the capacitance value of Cst can be increased.

Figure 7:
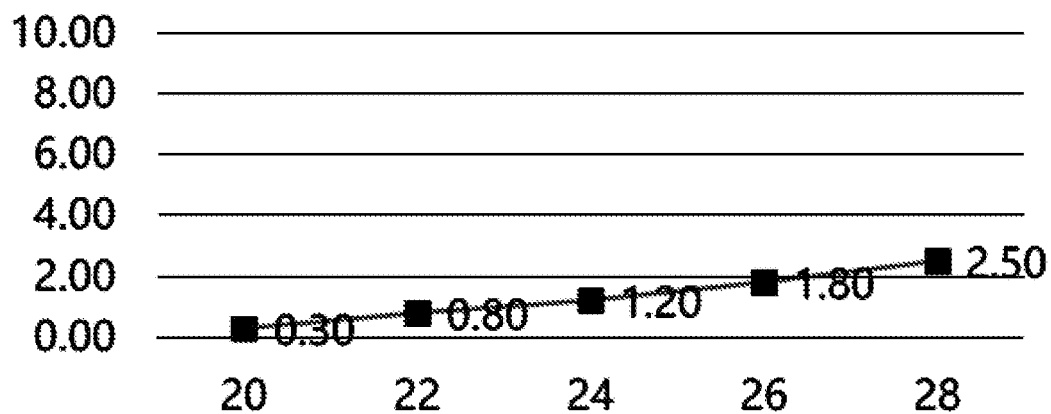
FIG. 7 is a schematic diagram showing relationship between grayscale difference values and high voltage values when displaying a grayscale L80 screen, with an insulating layer having a thickness of 3000 Å (angstroms) and a gate metal layer having a thickness of 5000 Å (angstroms)

FIG. 7 is a schematic diagram showing the relationship between grayscale difference values and high voltage values when displaying a grayscale L80 screen, with an insulating layer thickness of 3000 Å (angstroms) and a gate metal layer thickness of 5000 Å (angstroms).

In FIG. 7, the vertical axis represents the gray scale difference value between the far-end pixels and near-end pixels, and the horizontal axis represents the high voltage value;
Wherein, the high voltage value is the high voltage value of the gate drive signal provided by the gate line.

As can be seen from FIG. 7, when the thickness of the insulating layer is 5000 Å (angstroms), the gray scale difference value is low. When the high voltage value is 26V, the corresponding gray scale difference value is 1.8 gray scales.

Figure 8:
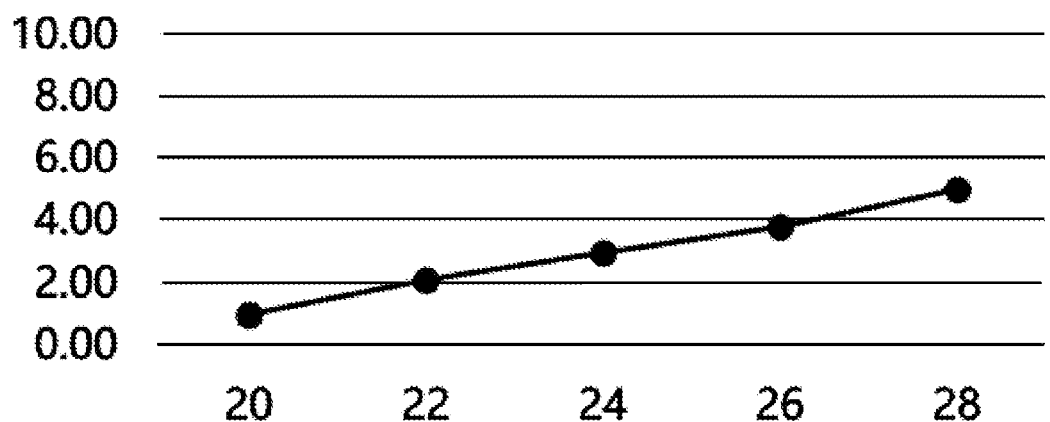
FIG. 8 is a schematic diagram showing relationship between grayscale difference values and high voltage values when displaying a grayscale L80 screen, with an insulating layer having a thickness of 3000 Å (angstroms) and a gate metal layer having a thickness of 3500 Å (angstroms)

FIG. 8 is a schematic diagram showing the relationship between grayscale difference values and high voltage values when displaying a grayscale L80 screen, with an insulating layer thickness of 3000 Å (angstroms) and a gate metal layer thickness of 3500 Å (angstroms).

Figure 9:
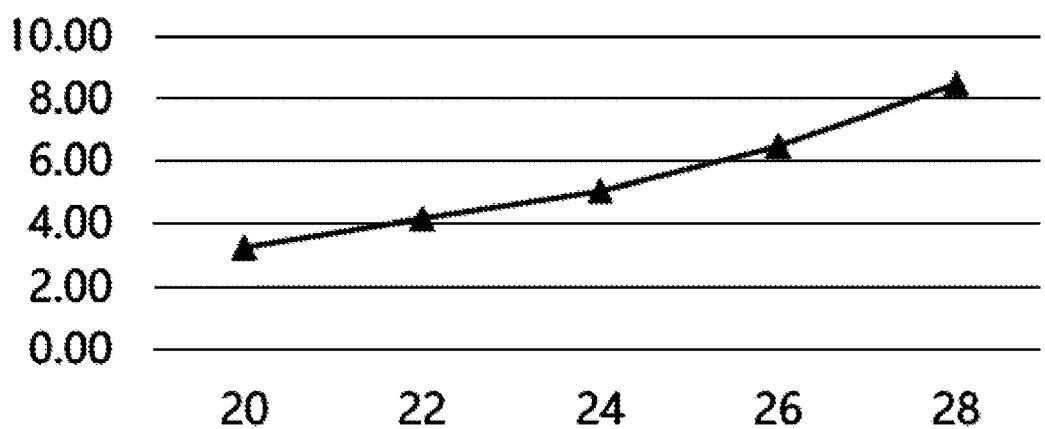
FIG. 9 is a schematic diagram showing relationship between grayscale difference values and high voltage values when displaying a grayscale L80 screen, with an insulating layer having a thickness of 2200 Å (angstroms) and a gate metal layer having a thickness of 5000 Å (angstroms)

FIG. 9 is a schematic diagram showing the relationship between grayscale difference values and high voltage values when displaying a grayscale L80 screen, with an insulating layer thickness of 2200 Å (angstroms) and a gate metal layer thickness of 5000 Å (angstroms).

In FIG. 7, FIG. 8, and FIG. 9, the unit of the horizontal axis is volts (V), and the unit of the vertical axis is volts (V).

Comparing FIG. 7, FIG. 8, and FIG. 9, it can be seen that when the thickness of the gate metal layer is larger, the gray scale difference value is smaller.

The display device according to at least one embodiment of the present disclosure includes the foregoing display substrate.

Figure 10:
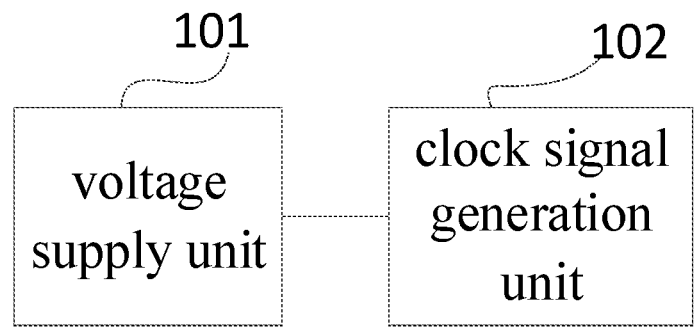
FIG. 10 is a schematic diagram showing connection relationship between a voltage supply unit and a clock signal generation unit included in a display device according to at least one embodiment of the present disclosure.

As shown in FIG. 10, the display device according to at least one embodiment of the present disclosure further includes a voltage supply unit 101 and a clock signal generation unit 102; a first drive module includes multiple stages of first drive circuits, and a second drive module includes multiple stages of second drive circuits; the first drive circuit is electrically connected to a corresponding first output clock signal line; the second drive circuit is electrically connected to a corresponding second output clock signal line;
the voltage supply unit 101 is electrically connected to the clock signal generation unit 102 and is configured to provide a high voltage signal to the clock signal generation unit;
the clock signal generation unit 102 is configured to generate a first output clock signal and a second output clock signal based on the high voltage signal.

In at least one embodiment of the present disclosure, the ΔVp difference between the near-end pixels and far-end pixels electrically connected to the gate line can be reduced by reducing the high voltage value (the high voltage value is the voltage value of the high voltage signal, and the high voltage value can also be the high voltage value of the gate drive signal on the gate line), thereby improving the brightness difference between the same color group in different areas (left and right sides).

Figure 11:
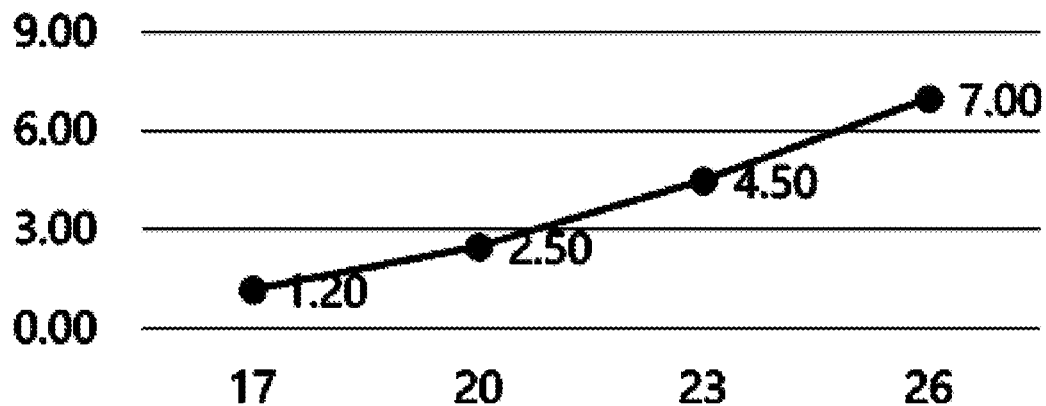
FIG. 11 is a schematic diagram showing relationship between high voltage values and grayscale difference values when displaying a grayscale L80 screen, with a gate metal layer having a thickness of 3500 Å (angstroms) and an insulating layer having a thickness of 6000 Å (angstroms)

FIG. 11 is a schematic diagram showing the relationship between high voltage values and grayscale difference values when displaying a grayscale L80 screen, with a gate metal layer thickness of 3500 Å (angstroms) and an insulating layer thickness of 6000 Å (angstroms).

In FIG. 11, the horizontal axis represents the high voltage value and the vertical axis represents the gray scale difference value.

In FIG. 11, the units of both the horizontal and vertical axes are volts (V).

As can be seen from FIG. 11, when the high voltage value is reduced to 17V, the gray scale difference value is 1.2 gray scales and the half-red-half-green problem is significantly improved.

In at least one embodiment of the present disclosure, the voltage supply unit is configured to control the voltage value of the high voltage signal to be less than a voltage value threshold.

Optionally, the voltage value threshold can be, for example, 22V, but is not limited to this. In actual operation, the voltage value threshold can be selected according to actual conditions. For example, the high voltage value can be 17V.

In at least one embodiment of the present disclosure, in order to ensure the reliability of the display product, the high voltage value should not be too large and the resistance value of the resistor electrically connected to the output clock signal line should not be too large. Therefore, a combination scheme of reducing the high voltage value and increasing the resistance value can be used to improve the half-red-half-green problem. Through simulation software simulation, when the high voltage value is 20V and the resistance value is 330 ohms, the gray scale difference value is within 1.8 gray scales.

Figure 12:
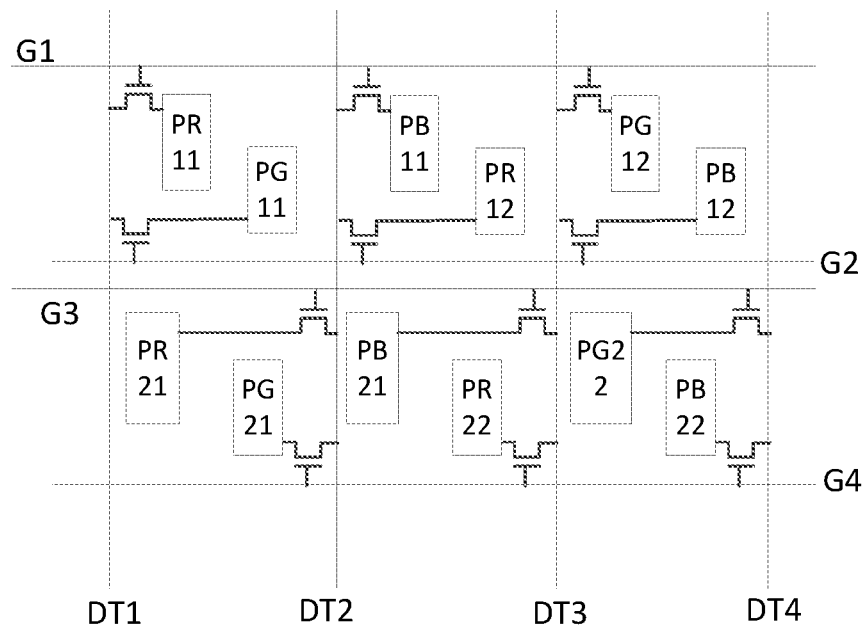
FIG. 12 is a schematic diagram of a red sub-pixel circuit in a first row and a first column, a green sub-pixel circuit in a first row and a first column, a blue sub-pixel circuit in the first row and the first column, a red sub-pixel circuit in the first row and a second column, a green sub-pixel circuit in the first row and the second column, a blue sub-pixel circuit in the first row and the second column, a red sub-pixel circuit in a second row and the first column, a green sub-pixel circuit in the second row and the first column, a blue sub-pixel circuit in the second row and the first column, a red sub-pixel circuit in the second row and the second column, a green sub-pixel circuit in the second row and the second column, and a blue sub-pixel circuit in the second row and the second column.

FIG. 12 is a schematic diagram of a red sub-pixel circuit in the first row and first column, a green sub-pixel circuit in the first row and first column, a blue sub-pixel circuit in the first row and first column, a red sub-pixel circuit in the first row and second column, a green sub-pixel circuit in the first row and second column, a blue sub-pixel circuit in the first row and second column, a red sub-pixel circuit in the second row and first column, a green sub-pixel circuit in the second row and first column, a blue sub-pixel circuit in the second row and first column, a red sub-pixel circuit in the second row and second column, a green sub-pixel circuit in the second row and second column, and a blue sub-pixel circuit in the second row and second column.

In FIG. 12, the label PR11 is the pixel electrode included in the red sub-pixel circuit in the first row and first column, the label PG11 is the pixel electrode included in the green sub-pixel circuit in the first row and first column, and the label PB11 is the pixel electrode included in the blue sub-pixel circuit in the first row and first column. The label PR12 is the pixel electrode included in the red sub-pixel circuit in the first row and second column, the label PG12 is the pixel electrode included in the green sub-pixel circuit in the first row and second column, and the label PB12 is the pixel electrode included in the blue sub-pixel circuit in the first row and second column.

The label PR21 is the pixel electrode included in the red sub-pixel circuit in the second row and first column, the label PG21 is the pixel electrode included in the green sub-pixel circuit in the second row and first column, and the label PB21 is the pixel electrode included in the blue sub-pixel circuit in the second row and first column. The label PR22 is the pixel electrode included in the red sub-pixel circuit in the second row and second column, the label PG22 is the pixel electrode included in the green sub-pixel circuit in the second row and second column, and the label PB22 is the pixel electrode included in the blue sub-pixel circuit in the second row and second column.

The label G1 is the gate line in the first row, the label G2 is the gate line in the second row, the label G3 is the gate line in the third row, and the label G4 is the gate line in the fourth row. The label DT1 is the data line in the first column, the label DT2 is the data line in the second column, the label DT3 is the data line in the third column, and the label DT4 is the data line in the fourth column.

As shown in FIG. 12, the red sub-pixel circuit PR11 in the first row and first column is electrically connected to G1, the blue sub-pixel circuit PB11 in the first row and first column is electrically connected to G1, and the green sub-pixel circuit PG12 in the first row and second column is electrically connected to G1;

The green sub-pixel circuit PG11 in the first row and first column is electrically connected to G2, the red sub-pixel circuit PR12 in the first row and second column is electrically connected to G2, and the blue sub-pixel circuit PB12 in the first row and second column is electrically connected to G2. In other words, some of the sub-pixel circuits in the first row are electrically connected to G1, while others are electrically connected to G2;

The red sub-pixel circuit PR21 in the second row and first column is electrically connected to G3, the blue sub-pixel circuit PB21 in the second row and first column is electrically connected to G3, and the green sub-pixel circuit PG22 in the second row and second column is electrically connected to G3. The green sub-pixel circuit PG21 in the second row and first column is electrically connected to G4, the red sub-pixel circuit PR22 in the second row and second column is electrically connected to G4, and the blue sub-pixel circuit PB22 in the second row and second column is electrically connected to G4. In other words, some of the sub-pixel circuits in the second row are electrically connected to G3, while others are electrically connected to G4.

In at least one embodiment of the present disclosure, some of the sub-pixel circuits in the n-th row are electrically connected to the gate line of the (2n−1)-th row, while other sub-pixel circuits in the n-th row are electrically connected to the gate line of the 2n-th row, wherein n is a positive integer.

In at least one embodiment shown in FIG. 12, each pixel electrode can be formed on a first conductive layer, each thin film transistor gate can be formed on a gate metal layer, each thin film transistor source and drain can be formed on a source-drain metal layer, and each thin film transistor active layer can be formed on a semiconductor layer. Each gate line can be formed on a gate metal layer, and each data line can be formed on a source-drain metal layer.

The foregoing embodiments are preferred embodiments of the present disclosure. It should be noted that a person skilled in the art may make further modifications and improvements without departing from the spirit of the present disclosure, and these modifications and improvements shall also fall within the scope of the present disclosure.

What is claimed is:

1. A display substrate, comprising:
    a base substrate with a display area and a peripheral area surrounding the display area;
    a first drive module and a second drive module in the peripheral area;
    an array of sub-pixel circuits in the display area; the sub-pixel circuits having at least two colors including a first color and a second color;
    a plurality of rows of gate lines, with two rows of the gate lines between two adjacent rows of the sub-pixel circuits; and,
    a plurality of columns of data lines, with one column of the data line between every two columns of the sub-pixel circuits;
    wherein a portion of sub-pixel circuits having the first color located in the same row are electrically connected to one row of the gate line and are configured to write data voltage under control of a gate drive signal provided by the row of gate line;
    another portion of the sub-pixel circuits having the first color located in the same row are electrically connected to another row of gate line and are configured to receive data voltage under control of a gate drive signal provided by the another row of gate line;

wherein a portion of sub-pixel circuits having the second color located in the same row are electrically connected to one row of the gate line and are configured to write data voltage under control of a gate drive signal provided by the row of gate line;

another portion of the sub-pixel circuits having the second color located in the same row are electrically connected to another row of gate line and are configured to receive data voltage under control of a gate drive signal provided by the another row of gate line;

the first drive module is electrically connected to a first end of the row of gate line and is configured to provide a gate drive signal to the row of gate line;

the second drive module is electrically connected to a second end of the another row of gate line and is configured to provide a gate drive signal to the another row of gate line;

the first end and the second end are opposite ends;

in the sub-pixel circuits located in the same row, at least two sub-pixel circuits located at the same side of the data line are electrically connected to the data line.

2. The display substrate according to claim 1, wherein in the sub-pixel circuits located in the same row, at least two sub-pixel circuits are provided between two columns of the data lines, and the at least two sub-pixel circuits are electrically connected to one of the two columns of data lines.

3. The display substrate according to claim 1, wherein every two adjacent sub-pixel circuits having the same color located in the same row are electrically connected to different rows of gate lines, and each of the two adjacent sub-pixel circuits is configured to receive data voltage under control of a gate drive signal provided by a gate line connected with the each of the two adjacent sub-pixel circuits.

4. The display substrate according to claim 1, wherein the display substrate comprises N rows of sub-pixel circuits and 2N rows of gate lines; N is a positive integer;

odd-column sub-pixel circuits in the sub-pixel circuits having the same color located in the n-th row are electrically connected to the (2n−1)-th row of gate line, and even-column sub-pixel circuits in the sub-pixel circuits having the same color located in the n-th row are electrically connected to the 2n-th row of gate line; or, odd-column sub-pixel circuits in the sub-pixel circuits having the same color located in the n-th row are electrically connected to the 2n-th row of gate line, and even-column sub-pixel circuits in the sub-pixel circuits having the same color located in the n-th row are electrically connected to the (2n−1)-th row of gate line;

n is a positive integer less than or equal to N.

5. The display substrate according to claim 4, wherein the first drive module comprises N stages of first drive circuits and the second drive module comprises N stages of second drive circuits;

the n-th stage first drive circuit is electrically connected to a first end of the (2n−1)-th row of gate line and is configured to provide a gate drive signal to the (2n−1)-th row of gate line;

the n-th stage second drive circuit is electrically connected to a second end of the 2n-th row of gate line and is configured to provide the gate drive signal to the 2n-th row of gate lines.

6. The display substrate according to claim 4, wherein the first drive module comprises N stages of first drive circuits and the second drive module comprises N stages of second drive circuits;

the n-th stage first drive circuit is electrically connected to a second end of the (2n−1)-th row of gate line and is configured to provide a gate drive signal to the (2n−1)-th row of gate line;

the n-th stage second drive circuit is electrically connected to a first end of the 2n-th row of gate line and is configured to provide a gate drive signal to the 2n-th row of gate lines.

7. The display substrate according to claim 1, wherein the sub-pixel circuit comprises a data writing transistor and a pixel electrode;

a gate of the data writing transistor is electrically connected to the gate line electrically connected to the sub-pixel circuit, a first pole of the data writing transistor is electrically connected to the data line, and the second pole of the data writing transistor is electrically connected to the pixel electrode.

8. The display substrate according to claim 1, comprising N rows and M columns of red sub-pixel circuits, N rows and M columns of green sub-pixel circuits, and N rows and M columns of blue sub-pixel circuits;

wherein the odd-column red sub-pixel circuits in the n-th row are electrically connected to the (2n−1)-th row of gate line, and the even-column red sub-pixel circuits in the n-th row are electrically connected to the 2n-th row of gate line;

the odd-column green sub-pixel circuits in the n-th row are electrically connected to the 2n-th row of gate line, and the even-column green sub-pixel circuits in the n-th row are electrically connected to the (2n−1)-th row of gate line;

the odd-column blue sub-pixel circuits in the n-th row are electrically connected to the (2n−1)-th row of gate line, and the even-column blue sub-pixel circuits in the n-th row are electrically connected to the 2n-th row of gate line;

M and N are positive integers, n is a positive integer less than or equal to N.

9. The display substrate according to claim 1, comprising N rows and M columns of red sub-pixel circuits, N rows and M columns of green sub-pixel circuits, and N rows and M columns of blue sub-pixel circuits;

wherein the odd-column red sub-pixel circuits in the n-th row are electrically connected to the 2n-th row of gate line, and the even-column red sub-pixel circuits in the n-th row are electrically connected to the (2n−1)-th row of gate line;

the odd-column green sub-pixel circuits in the n-th row are electrically connected to the (2n−1)-th row of gate line, and the even-column green sub-pixel circuits in the n-th row are electrically connected to the 2n-th row of gate line;

the odd-column blue sub-pixel circuits in the n-th row are electrically connected to the 2n-th row of gate line, and the even-column blue sub-pixel circuits in the n-th row are electrically connected to the (2n−1)-th row of gate line;

M and N are positive integers, n is a positive integer less than or equal to N.

10. The display substrate according to claim 8, wherein the (2a−1)-th column red sub-pixel circuits in odd rows are electrically connected to the (4a−3)-th column data line, the (2a−1)-th column green sub-pixel circuits in odd rows are electrically connected to the (4a−3)-th column data line, and the (2a−1)-th column blue sub-pixel circuits in odd rows are electrically connected to the (4a−2)-th column data line;

the 2a-th column red sub-pixel circuits in odd rows are electrically connected to the (4a−2)-th column data line, the 2a-th column green sub-pixel circuits in odd rows are electrically connected to the (4a−1)-th column data line, and the 2a-th column blue sub-pixel circuits in odd rows are electrically connected to the (4a−1)-th column data line;

the (2a−1)-th column red sub-pixel circuits in even rows are electrically connected to the (4a−2)-th column data line, the (2a−1)-th column green sub-pixel circuits in even rows are electrically connected to the (4a−2)-th column data line, and the (2a−1)-th column blue sub-pixel circuits in even rows are electrically connected to the (4a−1)-th column data line;

the 2a-th column red sub-pixel circuits in even rows are electrically connected to the (4a−1)-th column data line, the 2a-th column green sub-pixel circuits in even rows are electrically connected to the 4a-th column data line, and the 2a-th column blue sub-pixel circuits in even rows are electrically connected to the 4a-th column data line;

a is a positive integer.

11. The display substrate according to claim 5, wherein the first drive circuit is further electrically connected to a corresponding first output clock signal line and is configured to, under control of a potential of a corresponding first pull-up node, provide a first output clock signal on the first output clock signal line to the gate line electrically connected to the first drive circuit;

the second drive circuit is further electrically connected to a corresponding second output clock signal line and is configured to, under control of a potential of a corresponding second pull-up node, provide a second output clock signal on the second output clock signal line to the gate line electrically connected to the second drive circuit.

12. The display substrate according to claim 1, wherein the gate lines extend in a horizontal direction, with the first end being a left end and the second end being a right end.

13. A display device, comprising a display substrate; wherein the display substrate includes:

a base substrate with a display area and a peripheral area surrounding the display area;

a first drive module and a second drive module in the peripheral area;

an array of sub-pixel circuits in the display area; the sub-pixel circuits having at least two colors including a first color and a second color;

a plurality of rows of gate lines, with two rows of the gate lines between two adjacent rows of the sub-pixel circuits; and, a plurality of columns of data lines, with one column of the data line between every two columns of the sub-pixel circuits;

wherein a portion of sub-pixel circuits having the first color located in the same row are electrically connected to one row of the gate line and are configured to write data voltage under control of a gate drive signal provided by the row of gate line;

another portion of the sub-pixel circuits having the first color located in the same row are electrically connected to another row of gate line and are configured to receive data voltage under control of a gate drive signal provided by the another row of gate line;

wherein a portion of sub-pixel circuits having the second color located in the same row are electrically connected to one row of the gate line and are configured to write data voltage under control of a gate drive signal provided by the row of gate line;

another portion of the sub-pixel circuits having the second color located in the same row are electrically connected to another row of gate line and are configured to receive data voltage under control of a gate drive signal provided by the another row of gate line;

the first drive module is electrically connected to a first end of the row of gate line and is configured to provide a gate drive signal to the row of gate line;

the second drive module is electrically connected to a second end of the another row of gate line and is configured to provide a gate drive signal to the another row of gate line; the first end and the second end are opposite ends;

in the sub-pixel circuits located in the same row, at least two sub-pixel circuits located at the same side of the data line are electrically connected to the data line.

14. The display device according to claim 13, further comprising a voltage supply unit and a clock signal generation unit; wherein the first drive module comprises multiple stages of first drive circuits, and the second drive module comprises multiple stages of second drive circuits; the first drive circuit is electrically connected to a corresponding first output clock signal line; the second drive circuit is electrically connected to a corresponding second output clock signal line;

the voltage supply unit is configured to provide a high voltage signal to the clock signal generation unit;

the clock signal generation unit is configured to generate a first output clock signal and a second output clock signal based on the high voltage signal.

15. The display device according to claim 14, wherein the voltage supply unit is configured to control a voltage value of the high voltage signal to be less than a voltage value threshold.

* * * * *